(12) United States Patent
Ibrahimi et al.

(10) Patent No.: US 11,022,454 B2
(45) Date of Patent: Jun. 1, 2021

(54) TRANSPORTATION SYSTEM RECONSTRUCTION

(71) Applicant: GOOGLE LLC, Mountain View, CA (US)

(72) Inventors: Morteza Ibrahimi, Mountain View, CA (US); Damon Jude Wischik, Palo Alto, CA (US); Christopher David Pluntke, Palo Alto, CA (US); Balaji Satyanarayana Prabhakar, Palo Alto, CA (US); Deepak Merugu, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 471 days.

(21) Appl. No.: 15/918,889

(22) Filed: Mar. 12, 2018

(65) Prior Publication Data

US 2018/0202827 A1  Jul. 19, 2018

Related U.S. Application Data

(62) Division of application No. 14/578,246, filed on Dec. 19, 2014, now Pat. No. 9,915,542.

(60) Provisional application No. 61/996,681, filed on May 14, 2014, provisional application No. 61/919,455, filed on Dec. 20, 2013.

(51) Int. Cl.
*G01C 21/34* (2006.01)

(52) U.S. Cl.
CPC ....... *G01C 21/3492* (2013.01); *G01C 21/343* (2013.01); *G01C 21/3461* (2013.01)

(58) Field of Classification Search
CPC .................................................... G06Q 50/30
See application file for complete search history.

(56) References Cited

U.S. PATENT DOCUMENTS

| | | | | |
|---|---|---|---|---|
| 2002/0082772 | A1* | 6/2002 | Okano | G06Q 10/047 701/533 |
| 2013/0317747 | A1* | 11/2013 | Chidlovskii | G08G 1/0129 701/540 |
| 2015/0066361 | A1* | 3/2015 | Stenneth | G08G 1/127 701/465 |
| 2015/0286936 | A1* | 10/2015 | Furuya | G06Q 50/30 706/58 |

* cited by examiner

*Primary Examiner* — Genna M Mott
(74) *Attorney, Agent, or Firm* — Marshall, Gerstein & Borun LLP

(57) ABSTRACT

A system for reconstructing vehicle itinerary include a processor and a memory storing instructions, implemented by the processor, to cluster historical trip records into a plurality of clusters, each of the plurality of clusters including a set of historical trip records that describe events occurring within a predetermined time range at one location; identify a sequence of clusters that includes a cluster at each location; and estimate an itinerary for a vehicle based on the sequence of clusters and constraint data describing physical constraints, the itinerary for the vehicle describing a sequence of arrival and departure times at a sequence of locations for the vehicle.

20 Claims, 19 Drawing Sheets

```
800
```

```
                    ┌─────────┐
                    │  Start  │
                    └────┬────┘
                         ▼
   ┌──────────────────────────────────────────────┐
   │ Infer a sequence of stations for each bus    │
   │ service                                      │
   │ 810                                          │
   └──────────────────┬───────────────────────────┘
                      ▼
   ┌──────────────────────────────────────────────┐
   │ Estimate distribution of speeds for each     │
   │ bus service                                  │
   │ 820                                          │
   └──────────────────┬───────────────────────────┘
                      ▼
   ┌──────────────────────────────────────────────┐
   │ Accumulate a list of itineraries for each    │
   │ bus service                                  │
   │ 830                                          │
   └──────────────────┬───────────────────────────┘
                      ▼
   ┌ ─ ─ ─ ─ ─ ─ ─ ─ ─ ─ ─ ─ ─ ─ ─ ─ ─ ─ ─ ─ ─ ─┐
     Sort trips in records by boarding time
   │ 840                                         │
   └ ─ ─ ─ ─ ─ ─ ─ ─ ─ ─ ─ ─ ─ ─ ─ ─ ─ ─ ─ ─ ─ ─┘
                      ▼
   ┌──────────────────────────────────────────────┐
   │ Estimate likelihood that a trip in records   │◄───┐
   │ belongs to each of itineraries in the list   │    │
   │ 850                                          │    │
   └──────────────────┬───────────────────────────┘    │
                      ▼                                │
              Is it very likely that the trip          │
       Yes ◄── belongs to a bus in the list? ──► No    │
                        860                            │
         ▼                                  ▼          │
   ┌────────────────┐          ┌────────────────────┐  │
   │ Assign the trip│          │ Append a new bus   │  │
   │ to the bus     │          │ itinerary to the   │  │
   │ 870            │          │ list based on trip │  │
   └───────┬────────┘          │ 880                │  │
           │                   └─────────┬──────────┘  │
           └──────────┬──────────────────┘             │
                      ▼                                │
              All trips have been assigned? ──► No ────┘
                        890
                      Yes
                      ▼
                   ┌─────┐
                   │ End │
                   └─────┘
```

FIG. 8

TRANSPORTATION SYSTEM RECONSTRUCTION

CROSS-REFERENCE TO RELATED APPLICATIONS

This application is a divisional application of U.S. patent application Ser. No. 14/578,246, "Transportation System Reconstruction;" which claims priority under 35 U.S.C. § 119(e) to U.S. Provisional Patent Application Ser. No. 61/919,455, "Understanding and Managing Transportation System Operations and Usage," filed Dec. 20, 2013, which is incorporated herein by reference in its entirety; and to U.S. Provisional Patent Application Ser. No. 61/996,681, "Transportation System Reconstruction," filed May 14, 2014, which is incorporated herein by reference in its entirety.

BACKGROUND

1. Field of Art

The disclosure generally relates to the field of transportation system solutions, and specifically to reconstruction of the transportation system.

2. Description of the Relayed Art

Transportation systems provide transport service to streams of commuters who arrive at train stations, bus stops or highway entrances at random times. The "transportation service" a commuter wants is a trip that starts at one node (station, stop or highway entrance) of the transportation systems and ends at another node of the systems. During the course of obtaining this service, the commuter may make a mix of train, bus, car and/or bike journeys. The "commuting history" of a commuter, i.e., the trips made by that commuter over time (weeks, months), can possess discernible patterns (e.g., a particular commuter traverses the same route to work or school from home each day and vice versa) or be arbitrary (e.g., tourists visiting different parts of the city).

The collection of all trips made by the users of a transportation system in a day, duly annotated with metadata such as the origin and destinations of the trip, the swipe-in (entry) and swipe-out (exit) times, etc., makes up "the daily trip records" or "the daily fare records". The daily trip records represent the daily transportation demand placed upon the transportation system. In addition, the collection of all trips made by the vehicles in the transportation fleet including public transportation as well as private vehicles and other private systems, annotated with metadata such as the route, the exact location of each vehicle at any time, or the times of arrival and departure at each station or stop on the route, makes up of "the fleet trip details" and represents the available daily transport supply. When the daily demand is presented to the daily supply in a transport network, each commuter obtains a "service" from the network.

However, current transportation analysis systems do not provide a complete picture of the transportation systems. Some solutions may use schedules or Global Positioning System (GPS) information on vehicles to provide information about system operations, and provide the ability to send alerts to emergency responders. However, these methods do not provide visibility into how many people are using the transportation systems, and in what ways people are using the systems. Neither do these methods provide visibility into the quality of service provided by the transportations systems to the people. Furthermore, the current transportation solutions are limited in their abilities to perform sensitivity analyses, to run robust reports quickly and easily, and to collaborate on and share information.

In addition, while trip records are sometimes available, they also provide an incomplete picture of a system and the people who use the system. Each record might indicate an individual journey (e.g., a starting and ending point of a journey); however the finer details such as the actual train a commuter boards, the waiting time before boarding the train, etc., might not be available. As a result, it is difficult to see trends over certain time periods and/or stations.

Understanding the transportation system in aggregate is also a challenge. To know whether or not a system is performing well and to optimize the operations of the system, transportation system operators need to know quantities like occupancy, departures, waiting times at stations or platforms, etc., over time and on particular routes or at certain stops or stations. Current attempted solutions are expensive, incomplete, inaccurate, or a combination thereof. For example, certain current trains have sensors that can calculate the weight and then estimate a rough number of people on a train. Other current systems add GPS units or Radio Frequency Identification (RFID) scans to get information about a vehicle location. Other operation systems employ people to administer surveys and/or count the number of people in each train or on the platform at selected points in time. Therefore, all above current solutions involve additional hardware, instrumentation, or people.

Current transportation solutions, whether such approaches are technological, human, or otherwise, do not provide a complete picture of transportation systems. As a result, operators and planners lack the information to run their systems more efficiently. In addition, no current solutions infer system and traveler behavior from disparate sources of data, and use these inferences to supply a comprehensive transportation management solution. Accordingly, there is a need for a suite of methods for inferring, from incomplete or coarse-grained records, the fine details of the operation of a transit system.

SUMMARY

Embodiments of the present disclosure are generally directed to transportation system reconstruction. In some embodiments, a method, device, or system is disclosed for the reconstruction of transportation systems. The disclosed configuration comprises clustering historical trip records into a plurality of clusters. Each of the plurality of clusters includes a set of historical trip records that describe events occurring at roughly the same time and at one location. The disclosed configuration identifies a sequence of clusters that includes a cluster at each location; and estimating an itinerary for a vehicle based on the sequence of clusters and constraint data describing physical constraints. The itinerary for the vehicle describes a sequence of arrival and departure times at a sequence of locations for the vehicle.

Another aspect of the present disclosure collects a trip record describing a trip of a user. The trip record including swipe-in and swipe-out times at stations. The disclosed configuration determines the most likely route based on the trip record using a user preference model and splits the trip record into one or more trip segments based on the most likely route. The disclosed configuration assigns the one or more trip segments to one or more vehicles.

Yet another aspect of the present disclosure identifies, based on trip records describing swipe-in and swipe-out events, a pair of trip segments. Each segment includes an event time at a station. The configuration determines a distance between the pair of trip segments based on the event times included in the pair of trip segments. The configuration embeds the pair of trip segments in a low dimensional space based on the distance and assigns the pair of trip segments to one or more vehicles based on their locations in the low dimensional space.

Yet another aspect of the present disclosure infers a sequence of stations for each transportation service provided by each vehicle; estimating a distribution of speeds for the each transportation service provided by the each vehicle. The configuration accumulates a list of itineraries, in which each of the itineraries corresponding to the each vehicle. The configuration estimates likelihood that a trip in trip records belongs to the each itinerary corresponding to the each vehicle and assigns the trip to a vehicle based on the likelihood.

BRIEF DESCRIPTION OF THE DRAWINGS

FIG. 8 is a flowchart illustrating yet another example method for reconstructing vehicle itineraries according to one embodiment.

DETAILED DESCRIPTION

The disclosed embodiments have advantages and features, which will be more readily apparent from the detailed description, and the accompanying figures (or drawings).

The FIGS. 1-17 and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

To overcome deficiencies of traditional transportation system solutions, a system (and computer-implemented method and non-transitory storage medium) is configured to reconstruct transportation systems in fine details. In one example configuration, the system collects trip records and infers the presence of a vehicle by detecting clusters of trip records. In addition, the system reconstructs fine details of the transportation network by determining whether two vehicle reports in the trip records or two clusters are likely to refer to the same vehicle based on the knowledge of routes and speeds of the vehicle. Furthermore, the system makes inferences about vehicle itineraries and vehicle identities using knowledge about how transit passengers use the transportation network or system. The system may also incorporate models of likely human behavior, either obtained from external data sources or inferred from the reconstruction, to refine the inferences of vehicle itineraries and to further determine which vehicle a passenger is likely to have taken.

The system provides numerous advantages over the traditional model. One advantage of the system is to infer, from incomplete or coarse-grained records, the fine details of the operation of a transportation system. This inference may be also referenced as reconstruction. Another advantage of the disclosed embodiments is that whereas the fine details may be desirable by the operator, and whereas the coarse-grained records may already be available, e.g., to support ticketing, the cost of installing monitoring devices to collect the fine details may be prohibitive such that the disclosed configurations help address these aspects.

Example Computing Environment

Figure 1:
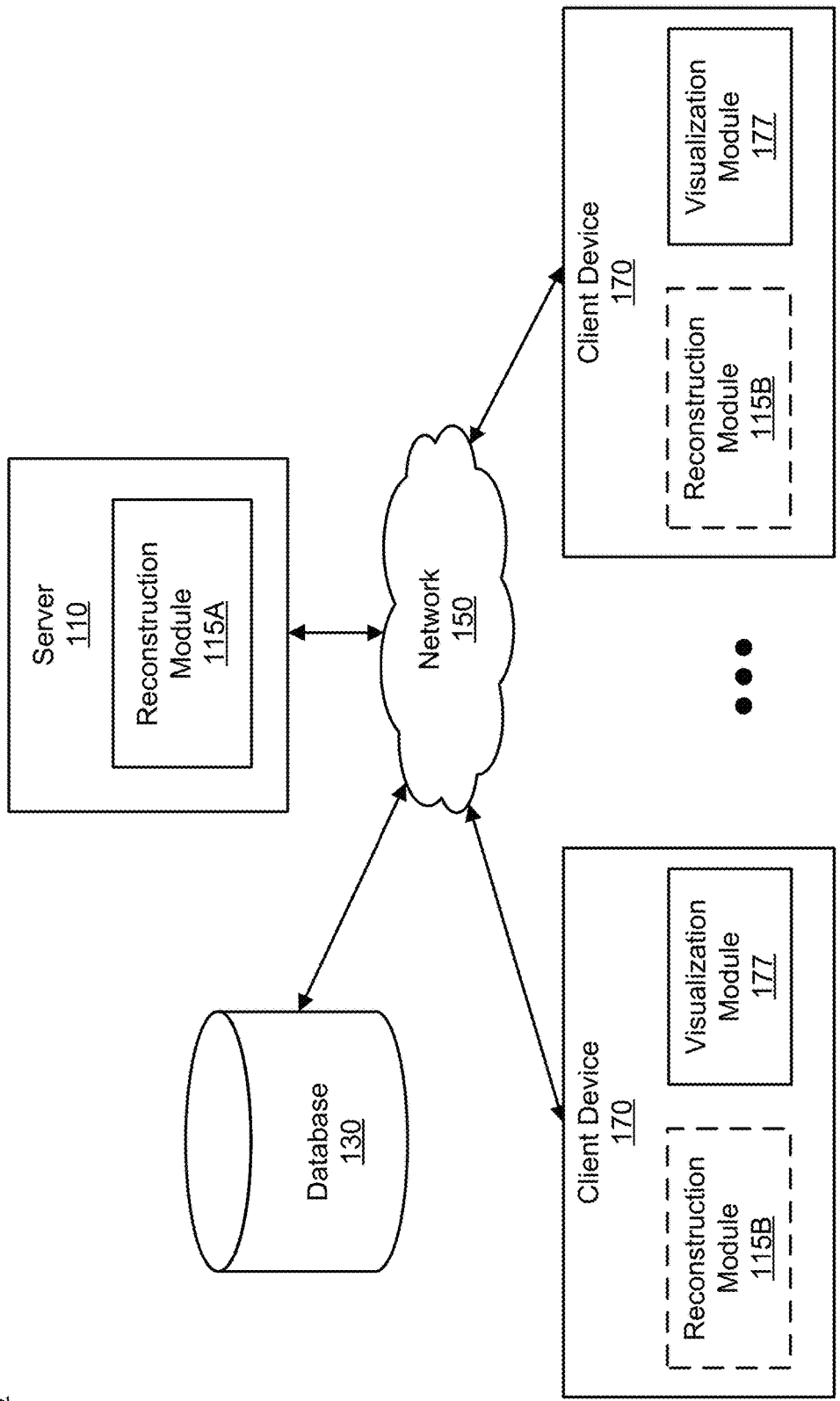
FIG. 1 is a high-level block diagram of an example computing environment for enabling reconstruction of transportation systems according to one embodiment.

FIG. 1 shows an example computing environment 100 for enabling reconstruction of transportation systems according to one embodiment. The computing environment 100 includes one or more servers (generally, server) 110, one or more client devices (generally, client device) 170 and one or more databases (generally, database) 130 connected by a network 150. Only one server 110, two client devices 170 and a database 130 are shown in FIG. 1 in order to simplify and clarify the description. Alternate or additional embodiments of the computing environment 100 can have multiple servers 110 and databases 130, and more than two client devices 170 connected to the network 150. Likewise, the functions performed by the various entities of FIG. 1 may differ in different embodiments.

The server 110 collects trip records describing trips made by users of transportation networks in a period of time. For example, the server 110 retrieves, from third-party resources, daily fare records or trip records based on transportation activities of commuters in the transportation network within a predefined period of time, e.g., in a day. In one embodiment, the server 110 also collects trips made by vehicles in the transportation fleet. For example, the server 110 retrieves, from third-party resources, daily fleet data based on the trips of vehicles in the transportation networks. In one embodiment, based on the collected fare records of the transportation networks, the server 110 determines clusters of the records that indicates an arrival or departure of a vehicle. The server 110 also identifies a sequence of clusters and assigns the sequence of clusters to a vehicle. The server 110 further reconstructs the itinerary of the vehicle based on the sequence of clusters and some physical constraints. The server 110 may also make inferences about which vehicle a passenger is likely to have taken. In this way, the server 110 reconstructs fine details of the transportation systems based on the incomplete or coarse-grained trip records or fleet data. For example, the fine details include the timing or schedule of each vehicle in the transportation system (e.g., which stops the vehicle visited in which order, and its arrival and departure times at each stop), and the occupancy of each vehicle in the transportation system (e.g., which passengers were on which vehicles).

In one embodiment, the server 110 includes a reconstruction module 115A (collectively and individually also referred to generally as 115) to mainly perform the functions of the server 110 described above. The reconstruction module 115 and the functions will be described in further detail below with reference to FIG. 3. Other embodiments of the server 110 may include different and/or additional components. In addition, the functions may be distributed among the components 110, 130, 170 in a different manner than described herein. For example, the reconstruction module 115 may be completely or partly stored on one or more of the client devices 170, illustrated as a reconstruction module 115B in FIG. 1.

A client device 170 is an electronic device used by a user to perform functions such as querying transportation information, consuming digital content, executing software applications, browsing websites hosted by web servers on the network 150, downloading files, and interacting with the server 110. For example, the client device 170 may be a dedicated e-Reader, a smartphone, or a tablet, laptop, notebook, or desktop computer. The client device 170 includes and/or interfaces with a display device on which the user may view the visualizations such as graphical user interfaces (GUIs) showing transportation information. In addition, the client device 170 provides a user interface (UI), such as physical and/or on-screen buttons, with which the user may interact with the client device 170 to perform functions such as tapping on elements of transportation maps (e.g., a bus stop label, a train station label, etc.), inputting a stop or station name, selecting a bus or subway line, zooming in and/or out the transportation maps, and any other possible interactions.

In one embodiment, the client device 170 includes the reconstruction module 115B and the visualization module 177, but other embodiments of the client device 170 include different and/or additional components. In addition, the functions may be distributed among the components in a different manner than described herein.

The visualization module 177 renders visualizations based on the data generated by the reconstruction module 115, either residing on the server 110, or stored completely or partly on the client device 170. For example, the visualization module 177 renders a GUI displaying occupancy of a vehicle (e.g., the number of people on a bus or a train), the number of people waiting at a station or a stop, the number of people picked up at each station on a particular date and time, etc., based on the reconstructed details of the transportation networks by the reconstruction module 115.

The database 130 stores any data that is necessary for the server 110 and/or the client devices 170 to implement the functionalities described herein. For example, the database 130 stores the collected trip records describing transportation activities of commuters in the transportation networks and fleet data describing trips made by vehicles in the transportation networks.

The network 150, which can be wired, wireless, or a combination thereof, enables communications among the server 110, client devices 170 and the database 130 and can comprise the Internet. In one embodiment, the network 150 uses standard communications technologies and/or protocols. In another embodiment, the entities can use custom and/or dedicated data communications technologies instead of, or in addition to, the ones described above.

Computing Machine Architecture

Figure 2:
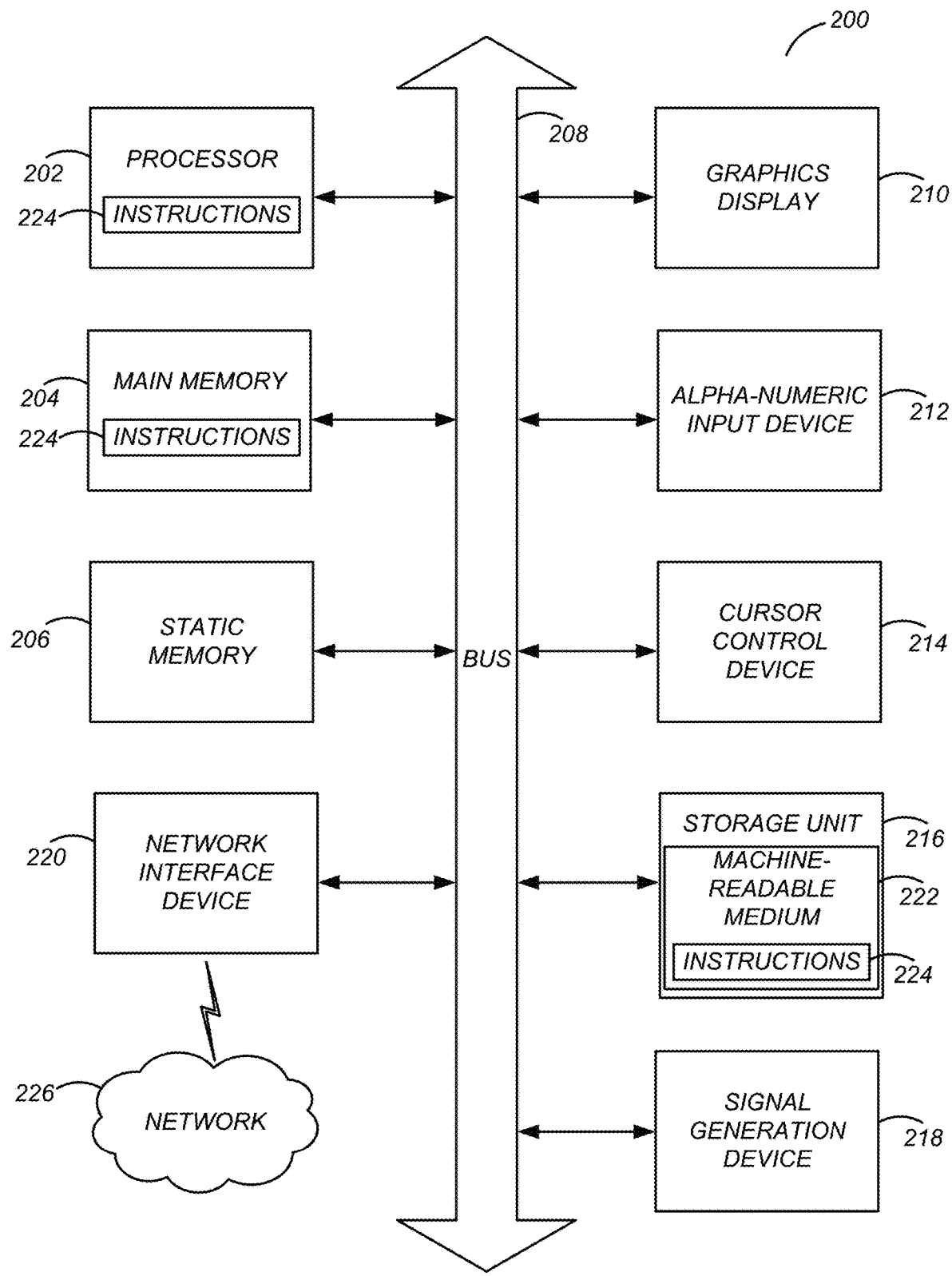
FIG. 2 is a block diagram illustrating components of an example machine able to read instructions from a machine-readable medium and execute them in a processor (or controller) for acting as a client device and/or server according to one embodiment.

Referring now to FIG. 2, it is a block diagram illustrating components of an example machine able to read instructions (e.g., software or program code) from a machine-readable medium and execute them in a processor (or controller) for acting as a client device 170 and/or a server 110 according to one embodiment. Specifically, FIG. 2 shows a diagrammatic representation of a machine in the example form of a computer system 200 within which instructions 224 (e.g., software or program code) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 224 (sequential or otherwise) that specify actions to be taken by that machine. Further, while only a single machine is illustrated, the term "machine" shall also be taken to include any collection of machines that individually or jointly execute instructions 224 to perform any one or more of the methodologies discussed herein.

The example computer system 200 includes one or more processors (generally processor 202) (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 204, and a static memory 206, which are configured to communicate with each other via a bus 208. The computer system 200 may further include graphics display unit 210 (e.g., a plasma display panel (PDP), a liquid crystal display (LCD), a projector, or a cathode ray tube (CRT)). The computer system 200 may also include alphanumeric input device 212 (e.g., a keyboard), a cursor control device 214 (e.g., a mouse, a trackball, a joystick, a motion sensor, or other pointing instrument), a storage unit 216, a signal generation device 218 (e.g., a speaker), and a network interface device 220, which also are configured to communicate via the bus 208.

The storage unit 216 includes a machine-readable medium 222 on which are stored instructions 224 embodying any one or more of the methodologies or functions described herein. The instructions 224 may also reside, completely or at least partially, within the main memory 204 or within the processor 202 (e.g., within a processor's cache memory) during execution thereof by the computer system 200, the main memory 204 and the processor 202 also constituting machine-readable media. The instructions 224

(e.g., software) may be transmitted or received over a network 226 via the network interface device 220.

While machine-readable medium 222 is shown in an example embodiment to be a single medium, the term "machine-readable medium" should be taken to include a single medium or multiple media (e.g., a centralized or distributed database, or associated caches and servers) able to store instructions (e.g., instructions 224). The term "machine-readable medium" shall also be taken to include any medium that is capable of storing instructions (e.g., instructions 224) for execution by the machine and that cause the machine to perform any one or more of the methodologies disclosed herein. The term "machine-readable medium" includes, but not be limited to, data repositories in the form of solid-state memories, optical media, and magnetic media.

Example Reconstruction Module

Figure 3:
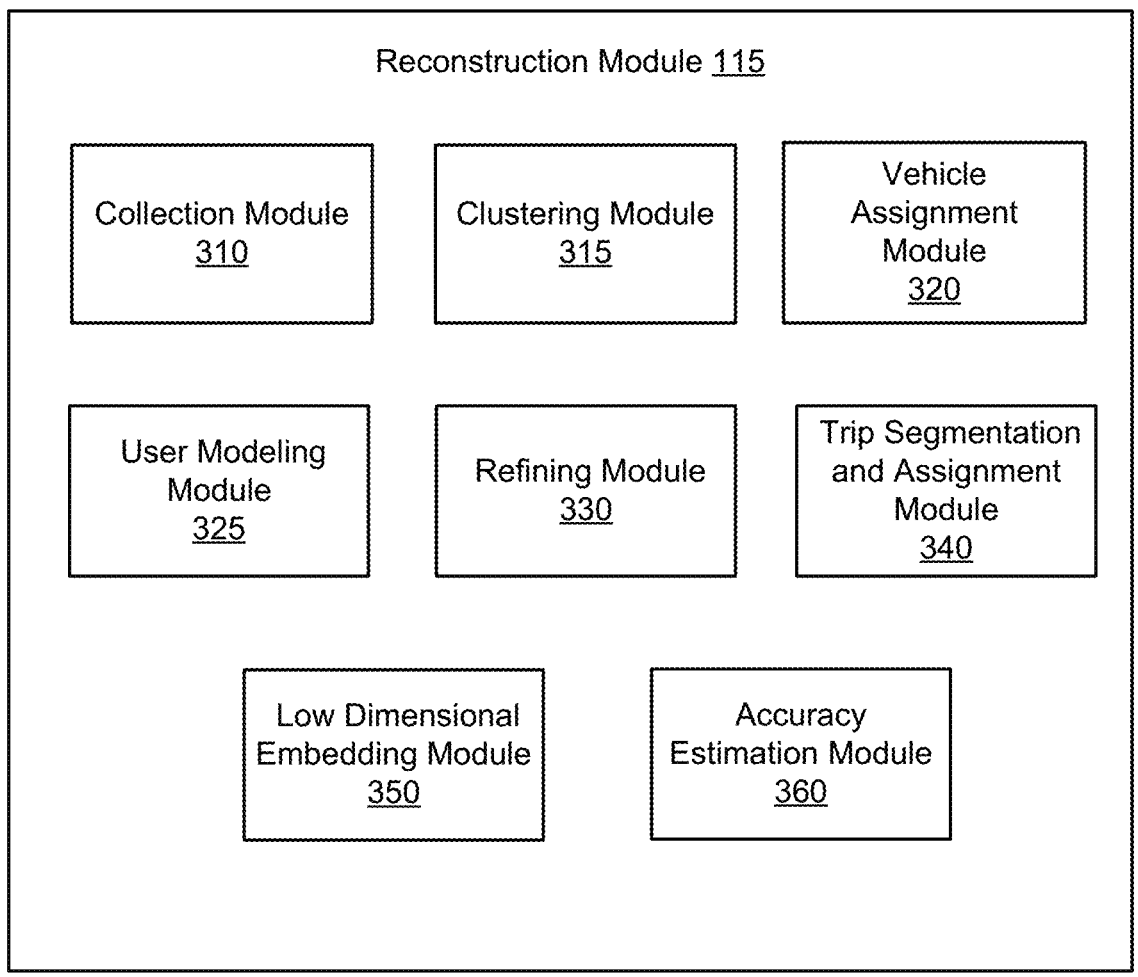
FIG. 3 is a block diagram illustrating a reconstruction module according to one embodiment.

Turning now to FIG. 3, it is a block diagram illustrating a reconstruction module 115 according to one embodiment. In the embodiment shown, the reconstruction module 115 has a collection module 310, a clustering module 315, a vehicle assignment module 320, an user modeling module 325, a refining module 330, a trip segmentation and assignment module 340, a trip segmentation and assignment module 340, a low dimensional embedding module 350, and an accuracy estimation module 360. Those of skill in the art will recognize that other embodiments of the summary subsystem 120 can have different and/or additional modules other than the ones described here, and that the functions may be distributed among the modules in a different manner. In addition, it is noted that the modules may be configured as computer program code (or software) comprised of instruction, e.g., instruction 224, storable in a storage unit, e.g., 216, 222, 224, and executable by a processor, e.g., 202.

The collection module 310 collects trip records describing trips made by users of transportation networks in a period of time, as described above. The trip records may be also referred to as fare records, hereinafter. For example, the collection module 310 retrieves, from third-party resources, daily trip records based on transportation activities of passengers in the transportation network in a day. In one embodiment, the trip records include metadata annotated with the trips. For example, the metadata describes the origins and destinations of the trips, historical user events associated with the trips such as swipe-in (entry) and swipe-out (exit) events occurred in a past time and at a specific location (e.g., a bus stop or a train station) associated with each passenger in a transportation system. Accordingly, the metadata describing the historical user events may include the swipe-in times and locations and swipe-out times and locations. In another embodiment, the trip records also include aggregate counts based on the user events in the transportation systems. For example, the aggregate counts describe the number of checkouts at a transit station. The trip records represent the transportation demand placed upon the transportation networks.

In one embodiment, the collection module 310 also collects trips made by vehicles in the transportation fleet. For example, the collection module 310 retrieves, from third-party resources, daily fleet data based on the trips of vehicles in the transportation networks annotated with metadata such as a route, an exact location of each vehicle at any time, times of arrival and departure at each station or stop on the route, etc. For example, the fleet data describe timestamps, locations and vehicle identifications (IDs) of vehicles in a toll way system. The daily fleet data indicates available daily transportation supply. In one embodiment, the collecting module 310 stores the collected trip records and fleet data in the database 130.

The clustering module 315 clusters the collected data into multiple clusters. In one embodiment, the clustering module 315 detects clusters of trip records. For example, the clustering module 315 clusters historical user events into clusters. Each of the clusters includes a set of historical user events occurring at roughly the same time and at the same location. For example, when a number of passengers (e.g., 100 passengers) swiped out of a train station at roughly the same time (e.g., 12:15:00 PM to 12:15:20 PM), the events are collected and the clustering module 315 detects a cluster of the events that can be used to indicate an arrival of a train at the station. Accordingly, the occurring times corresponding to the cluster of the swipe-out events are spread over a small time range, e.g., 20 seconds. The time range for the events in one cluster may vary depending on different situations of different stations or stops and can be determined by the clustering module 315 after inspecting the collected data. In one embodiment, the clustering module 315 implements a clustering algorithm to analyze the collected data and determine a time range for each cluster. For example, for a larger train that has more passengers, the time range may be bigger, such as 40 seconds.

In one embodiment, the clustering module 315 clusters swipe-in or swipe-out events into clusters at each station and associates a time or a time period with each cluster based on when the swipe-out events occur at each station. For example, the clustering module 315 associates the average occurring time of the swipe-out events in the cluster with the cluster. In one embodiment, the clustering module 315 also associates a location with the cluster. For example, the clustering module 315 associates the station or stop where the events occur with the cluster of the events. Each of the event time and event location associated with each cluster can be interpreted as roughly the arrival time and arrival location of a vehicle. The actual arrival time and location can be estimated by adjusting the event time and location based on physical constraints.

This clustering is motivated by the observation that the swipe-out time of trips which are served by the same train are close together and that in the cases where the swipe-in events happen at the time of boarding, e.g., in most normal buses, the same property is true about the swipe-in times.

In one embodiment, the clustering module 315 cooperates with the low dimensional embedding module 370 that embeds the collected data or records into a low dimensional space based on their distances. The clustering module 315 clusters the data or records in the low dimensional space into clusters that correspond to different vehicles. In one embodiment, the clustering module 315 applies machine learning tools, including but not limited to Gaussian mixture analysis algorithms, to the collected data and/or records to detect clusters.

The vehicle assignment module 320 analyzes and determines the flow of vehicles. For example, the vehicle assignment module 320 can make inferences about whether two vehicle reports or clusters are likely to refer to the same vehicle based on knowledge about routes and speeds of the vehicle obtained, e.g., from fleet data. For example, if the vehicle assignment module 320 learns that a transit route visits stop No. 5 before stop No. 6, and there was a vehicle at stop No. 5 at 12:15 pm and at stop No. 6 at 12:14 pm, then they cannot be the same vehicle. In another example, the vehicle assignment module 320 can use knowledge about speed distribution to make statistical inferences about whether two vehicle reports are likely to refer to the same vehicle.

In one embodiment, the vehicle assignment module 320 performs logical constraint analysis to determine vehicle routes and corresponding vehicle identity. For example, the vehicle assignment module 320 can make inferences about routes and vehicle identity based on user models describing how transit passengers use the transportation network. The user models can be generated by the user modeling module 325. For example, if a passenger boards a bus at stop "F312" and alights at stop "A985", then the vehicle assignment module 320 can infer that stop "F312" precedes stop "A985" in the route of the bus. This is particularly useful when reconstructing route exceptions, for example, due to building works, when the exact routes in operation on a given date might not be available in electronic records. In the preceding example, the clustering module 315 can identify trip clusters corresponding to the two stops. The vehicle assignment module 320 thereafter can infer that the trip clusters refer to the same vehicle.

In one embodiment, the vehicle assignment module 320 identifies a sequence of clusters. For example, the sequence of clusters includes one cluster at each location (e.g., a station or a stop). The sequence of clusters may include clusters at a sequence of consecutive locations (e.g., stations or stops). Alternatively, if data at one location is missing, the sequence of clusters may include clusters at inconsecutive locations. In one embodiment, to identify a sequence of clusters, the vehicle assignment module 320 may identify a first cluster associated with a first time and a first location (e.g., a station or a stop) from the multiple identified clusters by the clustering module 315. The first time may indicate an arrival time for a vehicle at the first station. The vehicle assignment module 320 can calculate an estimated arrival time for the vehicle at a next station based on the arrival time at the first station. For example, using the arrival time at the first station, the current estimate for the average speed of the vehicle (e.g., a train, a bus, a subway), and the distance between current location and the next location, the vehicle assignment module 320 calculates an estimated arrival time of the vehicle at the next location.

Based on the estimated arrival time at the next location, the vehicle assignment module 320 can identify the next cluster for a sequence. For example, the vehicle assignment module 320 identifies all the clusters at the next location, and assigns to each of clusters in the next location a likelihood score based on how close its time matches the estimated arrival time. The vehicle assignment module 320 identifies the cluster with the highest likelihood score as the next cluster in sequence. Consecutively, the vehicle assignment module 320 can determine the sequence of clusters at a queue of locations. In another embodiment, the vehicle assignment module 320 determines multiple possible sequences of clusters and identifies the top numbers of most likely sequences based on the likelihood scores assigned to the clusters. For example, if the vehicle assignment module 320 learns, from the fleet data, that there have been 10 trains serving in the transportation network, the vehicle assignment module 320 identifies 10 most likely sequences with the highest aggregate likelihood scores.

The vehicle assignment module 320 also estimates an itinerary for a vehicle based on the identified sequence of clusters. The identified sequence of clusters may represent an estimated trip served by a vehicle such as a train or a bus. The time and location associated with each cluster may indicate an arrival time or departure time of a vehicle at a location (e.g., a station or a stop). In one embodiment, the vehicle assignment module 320 estimates the arrival and/or departure time at each station for a vehicle using the time and location associated with the clusters in a sequence and constraint data. The constraint data may describe physical constraints of the transportation system, e.g., the time it generally takes a passenger to walk between the boarding platform and the swipe-in or swipe-out machine based on a physical layout of a facility. For example, the vehicle assignment module 320 amends the time associated with the cluster using the constraint data (e.g., the time it takes a passenger to walk between the boarding platform and the swipe-in or swipe-out machine) to obtain the arrival or departure time for the vehicle.

The user modeling module 325 generate user models describing likely user behavior. In one embodiment, the user modeling module 325 analyzes trip records obtained from external data sources to generate user models. In another embodiment, the user modeling module 335 obtains user models based on the inferences or reconstructions of the transportation system made by the clustering module 315 and the vehicle assignment module 320. The user models can then be incorporated into the refinement of the vehicle itineraries made by the refining module 330, or the passenger assignment processes made by the passenger assigning module 335.

The refining module 330 refines the reconstructed itineraries for vehicles. The refining module 330 adjusts the measurement of the speed of the vehicle based on the estimated itinerary for the vehicle and updates the sequence of clusters for the vehicle based on the adjusted speed of the vehicle. For example, using the estimated itinerary for the vehicle, the refining module 330 may cooperate with the vehicle assignment module 320 to recalculate the speed of the vehicle. With a new vehicle's speed measurement, the refining module 330 may control the vehicle assignment module 320 to identify a new sequence of clusters with the highest likelihood score. The refining module 330 updates the itinerary for the vehicle based on the new sequence of clusters.

In one embodiment, the refining module 330 may incorporate user models describing likely human behavior to refine the estimations of vehicle itineraries. For example, user models may indicate a likely length of time that it takes a bus passenger to swipe in after boarding the bus. Therefore, the refining module 330 determines whether a swipe-in event at time 12:05 is likely to belong to a bus, which departed the bus stop at time 12:03 based on the user models. In another example, the user models describe the likely time it takes a passenger to walk from a station's swipe-in entrance to the train platform; the refining module 330 then can control the clustering module 315 to incorporate the user models to improve the clustering.

In one embodiment, in cases where vehicle itineraries are not available and must instead be inferred from available trip data, the refining module 330 can cooperate with the clustering module 315, the vehicle assignment module 320 and the passenger assignment module to simultaneously make inferences both about vehicle itineraries and about vehicle occupancy (i.e., which passengers took which vehicles) by using iterative refinement techniques. For example, the clustering module 315 and the vehicle assignment module 320 can first make inferences about vehicle schedules in a subway system by using trip records from only passengers whose trips begin and end on the same line. Once the vehicle itineraries have been established, the refining module 330 controls the trip segmentation and assignment module 340 to make inferences about vehicle occupancy for passengers with interchanges.

In another example, if two vehicles become bunched together along part of their routes, the refining module 330 can control the vehicle assignment module 320 to exclude data from passengers who both boarded and alighted in this part of the overlapping route, for the purposes of inferring vehicle itineraries, and then control the trip segmentation and assignment module 340 to infer which vehicle those passengers are likely to have taken, and in turn the vehicle assignment module 320 can further infer the existence of extra vehicles as necessary. In yet another example, the refining module 330 can control the vehicle assignment module 320 to assign trips to discrete clusters using an iterative procedure, every iteration updating the likely cluster that a trip belongs to using e.g., belief propagation algorithms, and for each cluster, estimate the most likely itinerary for the vehicle it represents.

The trip segmentation and assignment module 340 reconstructs which vehicle a passenger is likely to have taken based on the collected trip records and/or fleet data. In one embodiment, the trip segmentation and assignment module 340 incorporates user models to make inferences about which vehicle a passenger has taken. For example, the trip segmentation and assignment module 340 determines, based on the trip records and information of the train system, that a passenger swiped in at station A at 12:05 PM, and swiped out at station B at 13:14 PM, and the most likely route from A to B involves a single interchange at C. The trip segmentation and assignment module 340 further learns, from the fleet data, the schedules for trains from station A to station C and from station C to station B. The trip segmentation and assignment module 340 can infer the likely trains taken by the passenger.

In one embodiment, the trip segmentation and assignment module 340 can be controlled by or can control the refining module 330 to work simultaneously with the vehicle assignment module 325 so that the inferences or reconstructions of vehicle itineraries and vehicle occupancy can be made simultaneously based on iterative refinement techniques. For example, the clustering module 315 and the vehicle assignment module 320 can first make inferences about vehicle schedules. Once the vehicle itineraries have been established, the trip segmentation and assignment module 340 estimates vehicle occupancy for passengers. In another example, when two trains become bunched together along part of their routes, the refining module 330 can control the vehicle assignment module 320 to exclude data from passengers who both boarded and alighted in this part of the overlapping route, for the purposes of inferring itineraries. The trip segmentation and assignment module 340 to infer which train or trains those passengers are likely to have taken, and in turn the vehicle assignment module 320 can further infer the existence of extra trains as necessary.

The trip segmentation and assignment module 340 receives a trip record describing a trip of a passenger. For example, the trip record includes swipe-in and swipe-out times at stations. The trip segmentation and assignment module 340 determines the most likely route based on the trip record using a user preference model. The trip segmentation and assignment module 340 then splits the trip record into one or more trip segments based on the most likely route that a passenger may have taken. For example, the segments are generated such that each segment can be made by boarding a single train, i.e., no interchange. In another example, the trip segmentation and assignment module 340 determines from the collected data that local transit (such as Bay Area Rapid Transit) service, Caltrain service and a bus service (such as a bus route 22) have vehicles commuting between Los Altos and the SFO airport. When a passenger went from Los Altos to SFO airport on Wednesday at 3 PM, the trip segmentation and assignment module 340 may determine which exact one or more vehicles the passenger took.

In one embodiment, a trip segment has a segment boarding time and a segment alighting time, which are also referred to as "segment start time and segment end time." In one embodiment, for each trip segment that the alighting time is known, e.g., the last segment for each trip, the trip segmentation and assignment module 340 assigns the segment to a likely train by comparing the segment start time and the itineraries of the trains. For example, the trip segmentation and assignment module 340 compares the segment start time with the departure time of the trains from a location (e.g., the platform of a station) corresponding to that swipe-out event. In addition, the trip segmentation and assignment module 340 may enforce physical constraints, e.g., the walking time from the platform to the swipe-out machines, while assigning the trip segments. A trip segment can be left unassigned if no itinerary of any train is close enough (e.g., within a certain time range such as 30 seconds, one minutes or two minutes) to the segment end time of the trip segment or multiple itineraries of multiple trains appear to be close enough.

In one embodiment, the trip segmentation and assignment module 340 identifies trip segments that have segment start times. For one trip segment that has a segment start time (referred to as "a first trip segment"), the trip segmentation and assignment module 340 identifies other trip segments that started from the same location as the first trip segment and also have segment start times. The trip segmentation and assignment module 340 determines, among these other trip segments, the k-closest trip segments to the first trip segment in term of in the segment start time. These k-closest trips segments to the first trip segment are referred to as neighbors or neighbor trip segments of the first trip segment. Furthermore, for each trip segment that has a segment start time and has not been assigned to a train, the trip segmentation and assignment module 340 selects a certain number of closest neighbors of that segment from among all segments which have been assigned (e.g. 5 or 10 neighbors), and if a significant majority of these neighbors (e.g. more than a certain percentage such as 70% or 90%) have been assigned to a specific train, then the segment in question is assigned to that same train.

In one embodiment, for each trip segment that is assigned to a train and is missing a start or end time, the trip segmentation and assignment module 340 estimates the start or end time based on other trip segments that are assigned to the same train and boarded or alighted on the same location. In another embodiment, a segment is assigned to a vehicle and the vehicle itinerary is known, the segment start or end time may be obtained from the itinerary. In addition, for any trip segment whose end time is inferred in this way (referred to as "the trip segment A") and which has a subsequent segment, if the start time of the subsequent segment is missing, the trip segmentation and assignment module 340 estimates it based on the end time of the trip segment A and the time that it takes to transfer from the swipe-out platform associated with the trip segment A to the swipe-in platform of the subsequence segment.

Furthermore, for any trip segment that the segment start time is inferred by referencing other segments assigned to the same train or by referencing itinerary of the train to which the trip segment is assigned (referred to as "the trip segment B") and has a previous segment, if the end time of the previous segment is missing, the trip segmentation and assignment module 340 estimates it based on the start time of the trip segment B and the time that it takes to transfer from the swipe-out platform of the previous segment to swipe-in platform of the trip segment B. In one embodiment, the trip segmentation and assignment module 340 repeats the above process for assigning the trip segments to trains until stable or until a fixed number of iteration has been done.

The low dimensional embedding module 350 reconstructs trip assignment and vehicle itinerary using low dimensional embedding techniques. In one embodiment, for each location (e.g., a platform of a station or a stop), the low dimensional embedding module 350 identifies all trip segments having segment start times at the location. The low dimensional embedding module 350 further identifies each pair of such segments, and sets the distance between the two segments in each pair to be the difference between the start times of the two segments. For example, a pair includes a segment A and a segment B; the low dimensional embedding module 350 determines the distance between segment A and B to be equal to the start time of segment B minus start time of segment A. In one embodiment, the low dimensional embedding module 350 also calculates another distance between the segments in each pair based on their segment alighting times. For example, for each pair, the low dimensional embedding module 350 set a second distance between the two segments in the pair as the difference between their segment alighting times. Furthermore, the low dimensional embedding module 350 compares the two measurements of the distance between a pair of trip segments and assigns the distance between the pair of trip segments to be the larger one of the two.

In one embodiment, once the low dimensional embedding module 350 has obtained the incomplete matrix of distances between trip segments, the low dimensional embedding module 350 embeds the trip segments into a low dimensional space (e.g., a two or three dimensional space). For example, the low dimensional embedding module 350 can use a linear rigid embedding algorithm to embed the trip segments.

In addition, the low dimensional embedding module 350 may cooperate with the clustering module 315 to cluster the trip segments in the low dimensional space into clusters with a limit on the maximum number of segments in each cluster. This maximum represents a physical constraint corresponding to the vehicle capacity. For example, depending on the route a bus is likely to take less 200 people in each run and the clustering module may be tuned such that it associate a prohibitive cost to clusters with more than 200 segments. Furthermore, the clustering module 315 discards the clusters that are not likely to be correct. For example, the clustering module 315 determines that a cluster is not likely to be correct if there are too few segments in the cluster. The clustering module 315 removes one or more incorrect clusters.

In one embodiment, the low dimensional embedding module 350 may cooperate with the vehicle assignment module 320 to number the clusters and assign the trip segments in each cluster to one train. For each train, the low dimensional embedding module 350 may also cooperate with the vehicle assignment module 320 to estimate its arrival or departure time based on the trips segments that are assigned to it and their start or end times.

The accuracy estimation module 360 estimates error bounds on the accuracy of reconstruction, using various techniques that include, but are not limited to, the following techniques. In one embodiment, the accuracy estimation module 360 applies swipe-in or swipe-out intra cluster variation to estimate the error bounds. For example, the accuracy estimation module 360 controls the clustering module 315 to incorporate the weighted sum of the intra cluster variations plus number of degrees of freedom as a measure of the quality of the clustering of the swipe-in or swipe-out events.

In another embodiment, the accuracy estimation module 360 calculates a trip to vehicle assignment confidence when the vehicle assignment module 320 assigns trips or trip segments to vehicles. For example, when the vehicle assignment module 320 assigns a trip or a trip segment to a vehicle based on the proximity of the swipe-in or swipe-out time of the trip or the start or end time of trip segment to the arrival or departure time of that vehicle, the accuracy estimation module 360 calculates the confidence in this assignment based on a probabilistic model of user behavior.

In yet another embodiment, when the vehicle assignment module 320 assigns a trip or trip segment to a vehicle based on the assignments of similar trips or trip segments, the accuracy estimation module 360 calculates a confidence for this assignment based on the homogeneity of the assignments of the similar trips or trip segments and the likelihood of observing such realization. In yet another embodiment, the accuracy estimation module 360 calculates a confidence for this assignment using bootstrap techniques, for example randomly perturbing the trip records and then re-running assignment and measuring how close the two assignments are.

Example Methods

Figure 4:
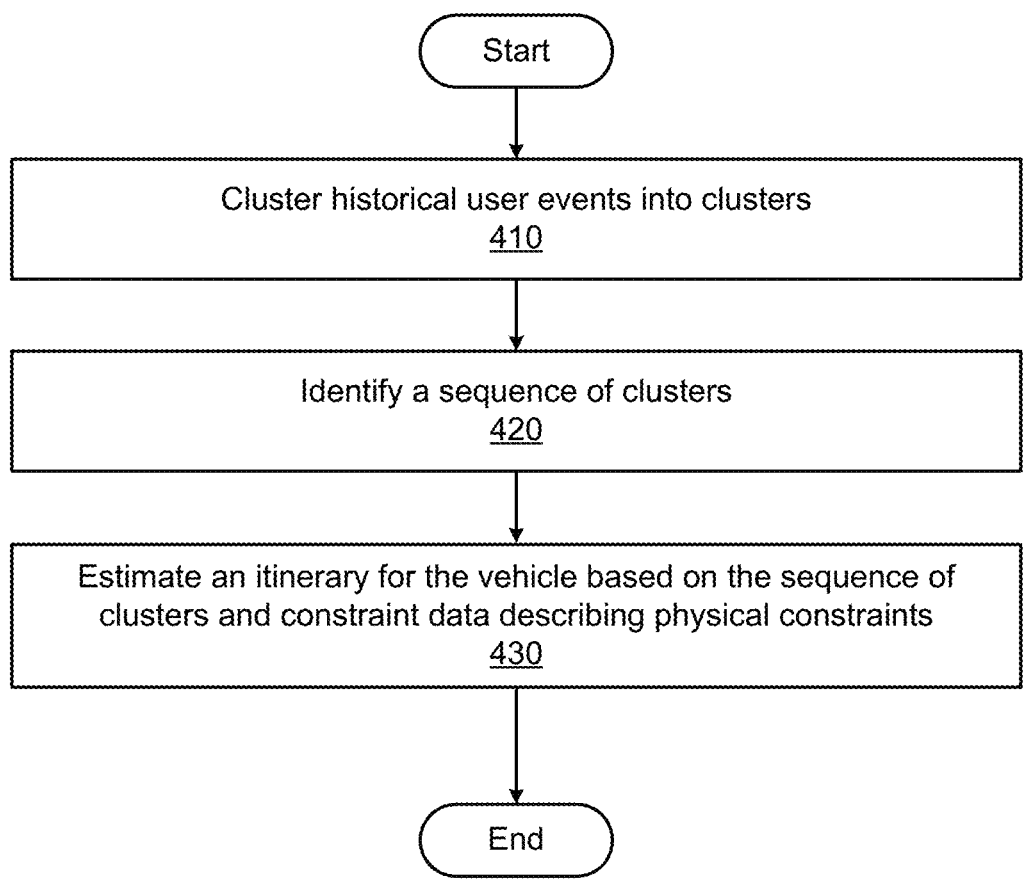
FIG. 4 is a flowchart illustrating an example method for reconstructing itineraries for vehicles in transportation systems according to one embodiment.

Turning now to FIG. 4, it is a flowchart illustrating an example method 400 for reconstructing itineraries for vehicles in transportation systems according to one embodiment. In one embodiment, FIG. 4 attributes the steps of the method 400 to the reconstruction module 115 of the server 110. However, some or all of the steps may be performed by other entities such as the client devices 170. In addition, some embodiments may perform the steps in parallel, perform the steps in different orders, or perform different steps, or perform it on a real-time stream of data rather than historical trip data. Also, it is noted that in one example embodiment the steps and/or modules may be embodied as instructions, e.g., 224, that may be executed by the processor 202 described with respect to FIG. 2.

Initially, the reconstruction module 115 clusters 410 historical user events into clusters. As described previously with regard to FIG. 1, the historical user events can be obtained from trip records of public transportation systems. The historical user events include user swipe-in or swipe-out events annotated with metadata such as swipe-in or swipe-out times and locations (e.g., stations or stops). In one embodiment, the reconstruction module 115 detects clusters of historical swipe-in or swipe-out events based on the proximity of their swipe-in or swipe-out times.

At step 420, the reconstruction module 115 identifies a sequence of clusters. In one embodiment, the reconstruction module 115 identifies a first cluster at a first station, and determines a next cluster at the next station along a route based on the swipe-in or swipe-out time of the first cluster, the distance between the two stations, the average speed of the vehicle, and the swipe-in or swipe-out times of the clusters associated with the next station. For example, the reconstruction module 115 estimates an arrival time for a vehicle at the next station using the swipe-out time of the first cluster, the distance between the two stations and the average speed of the vehicle. The reconstruction module 115 compares the swipe-out times of the clusters at the next station with the estimated arrival time for the vehicle and determines the most likely next cluster based on the comparison.

At step 430, the reconstruction module 115 estimates an itinerary for the vehicle based on the sequence of clusters and constraint data describing physical constraints. For example, the reconstruction module 115 estimates an arrival and/or departure time for the vehicle at each location based on the swipe-in and/or swipe-out time of each cluster in the sequence. In addition, in one embodiment, the reconstruction module 115 estimates the itinerary for the vehicle also by using the physical constraints such as the time that it takes an average passenger to walk between the swipe-in or swipe-out machine to the platform of the station.

Figure 5:
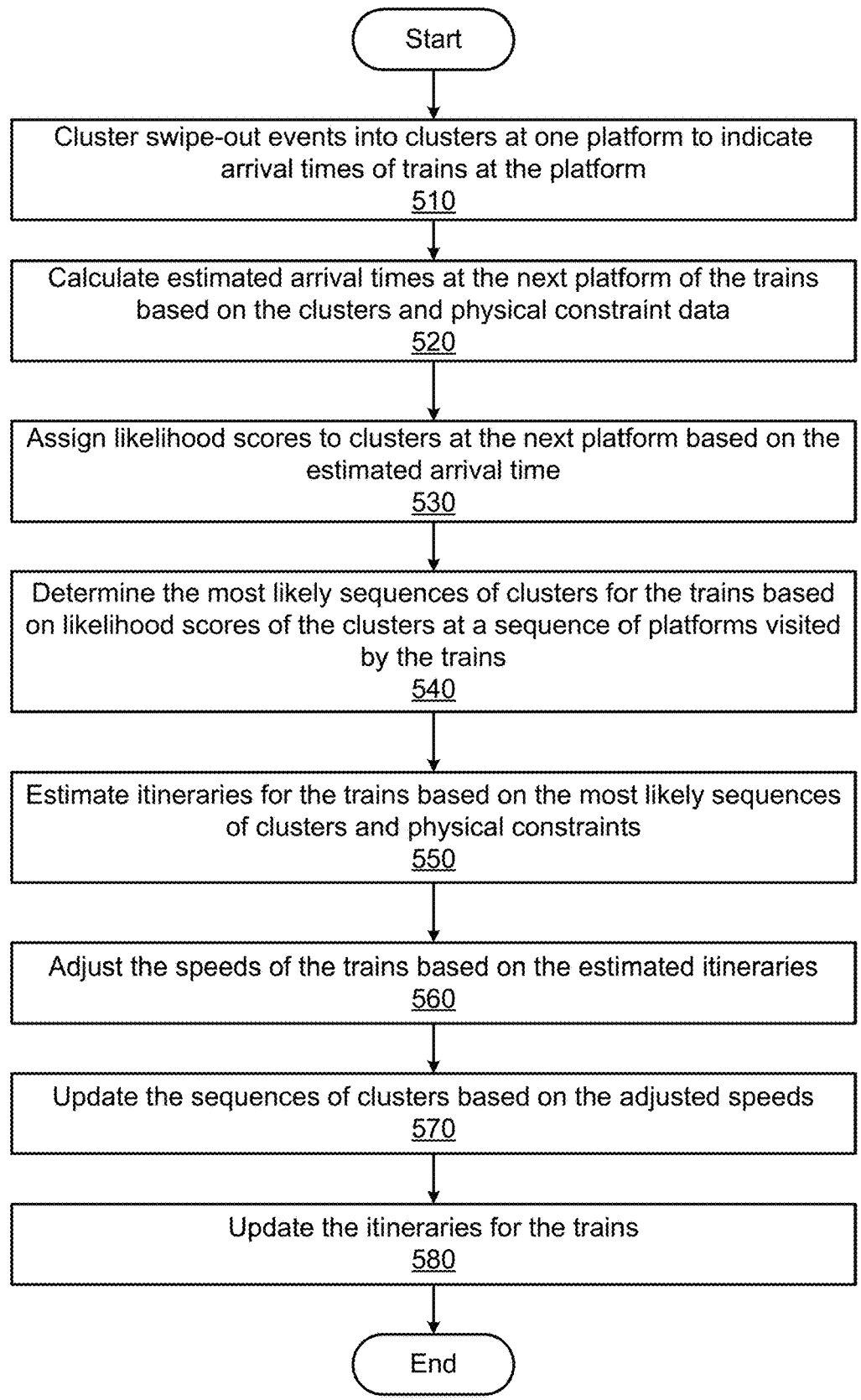
FIG. 5 is a flowchart illustrating another example method for reconstructing itineraries for vehicles in transportation systems according to one embodiment.

FIG. 5 is a flowchart illustrating an example method 500 for reconstructing itineraries for vehicles in transportation systems according to one embodiment. In one embodiment, FIG. 5 attributes the steps of the method 500 to parts of the sub-modules in the reconstruction module 115 of the server 110 or the client device 170. However, some or all of the steps may be performed by other entities. In addition, some embodiments may perform the steps in parallel, perform the steps in different orders, or perform different steps. Also, it is noted that in one example embodiment the steps and/or modules may be embodied as instructions, e.g., 224, that may be executed by the processor 202 described with respect to FIG. 2.

Initially, the clustering module 315 clusters 510 swipe-out events into clusters at one platform to indicate arrival times of trains at the platform. For example, the swipe-out times associated with the events indicate the arrival times of trains that have arrived at the corresponding platform of the station. In one embodiment, the clustering module 315 clusters swipe-in or swipe-out events into clusters at all stations or stops along one or more routes.

The vehicle assignment module 320 calculates 520 estimated arrival times at the next platform of the trains based on the clusters and physical constraint data. In one embodiment, the vehicle assignment module 320 estimates the arrival times for the trains at the next platform based on the swipe-out times of the clusters at the previous platform, the distance between the two platforms and the average speed of the vehicles. For example, for each cluster and the corresponding location (e.g., the platform of a station or a stop), based on the current estimate for the average speed of the vehicle (e.g., a train, a bus, a subway), and the distance between current location and the next location, the vehicle assignment module 320 calculates the arrival time of the vehicle at the next location.

At step 530, the vehicle assignment module 320 assigns likelihood scores to clusters at the next platform based on the estimated arrival time. For example, the vehicle assignment module 320 compares the swipe-out times of all the clusters at the next platform and the estimated arrival time of the train at the next platform and assigns likelihood scores to the clusters based on how closely the swipe-out times match the estimated arrival time.

At step 540, the vehicle assignment module 320 determines the most likely sequence of clusters for the trains based on likelihood scores of the clusters along a sequence of platforms visited by the trains. In one embodiment, the vehicle assignment module 320 identifies multiple sequences of clusters along a queue of platforms and determines one sequence with the highest likelihood scores for one train. This one sequence is the most likely sequence indicating the itinerary for the train.

At step 550, the vehicle assignment module 320 estimates itineraries for the trains based on the most likely sequences of clusters and physical constraints such as the time it takes for an average passenger to walk between the swipe-out machine and the platform.

The refining module 330 adjusts 560 the representation of the speeds of the trains based on the estimated itineraries, updates 570 the sequences of clusters based on the adjusted speeds and thus updates 580 the itineraries for the trains based on the updated sequences of clusters.

Figure 6A:
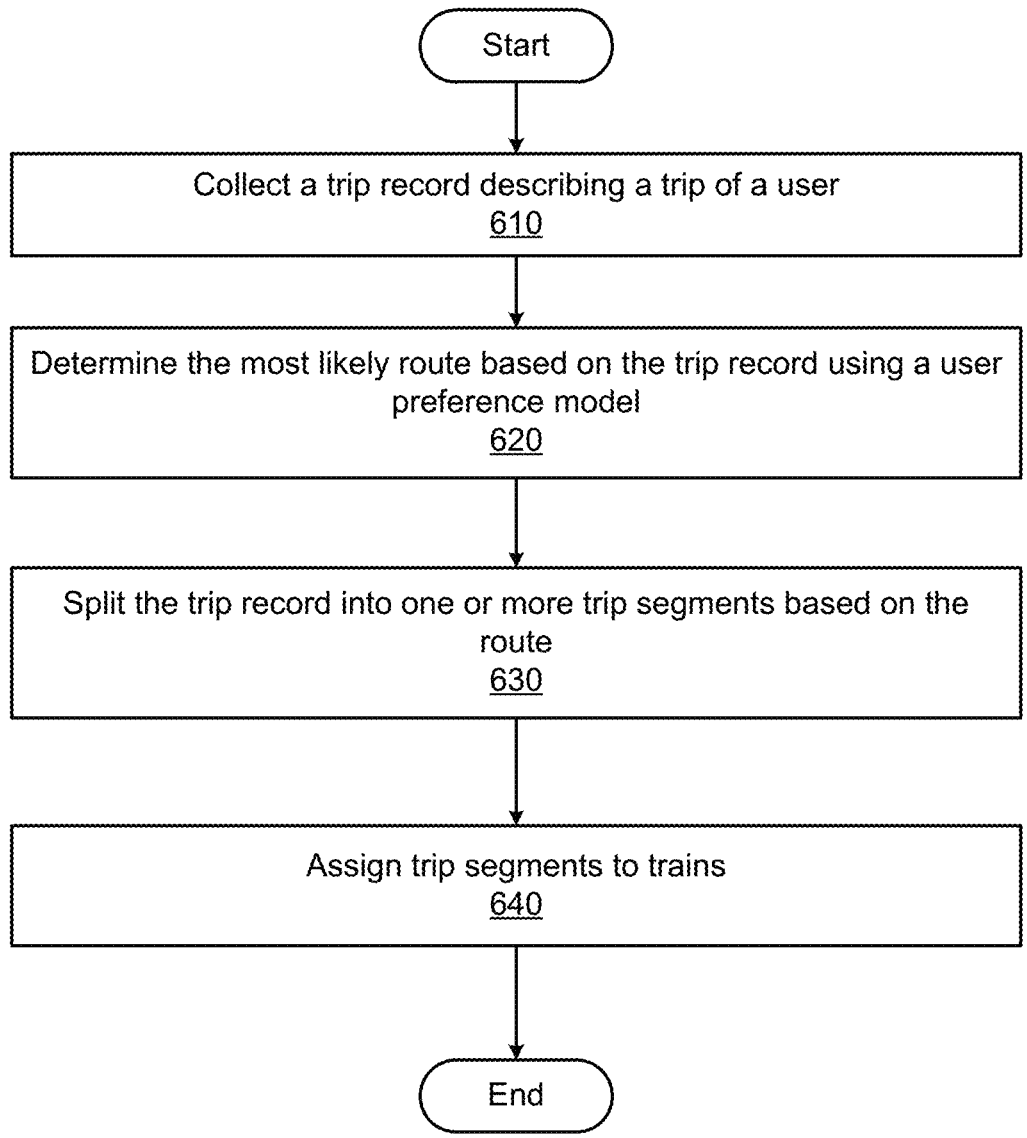
FIGS. 6A-6C are flowcharts illustrating an example method for assigning trips to vehicles in transportation systems according to one embodiment.
Figure 6B:
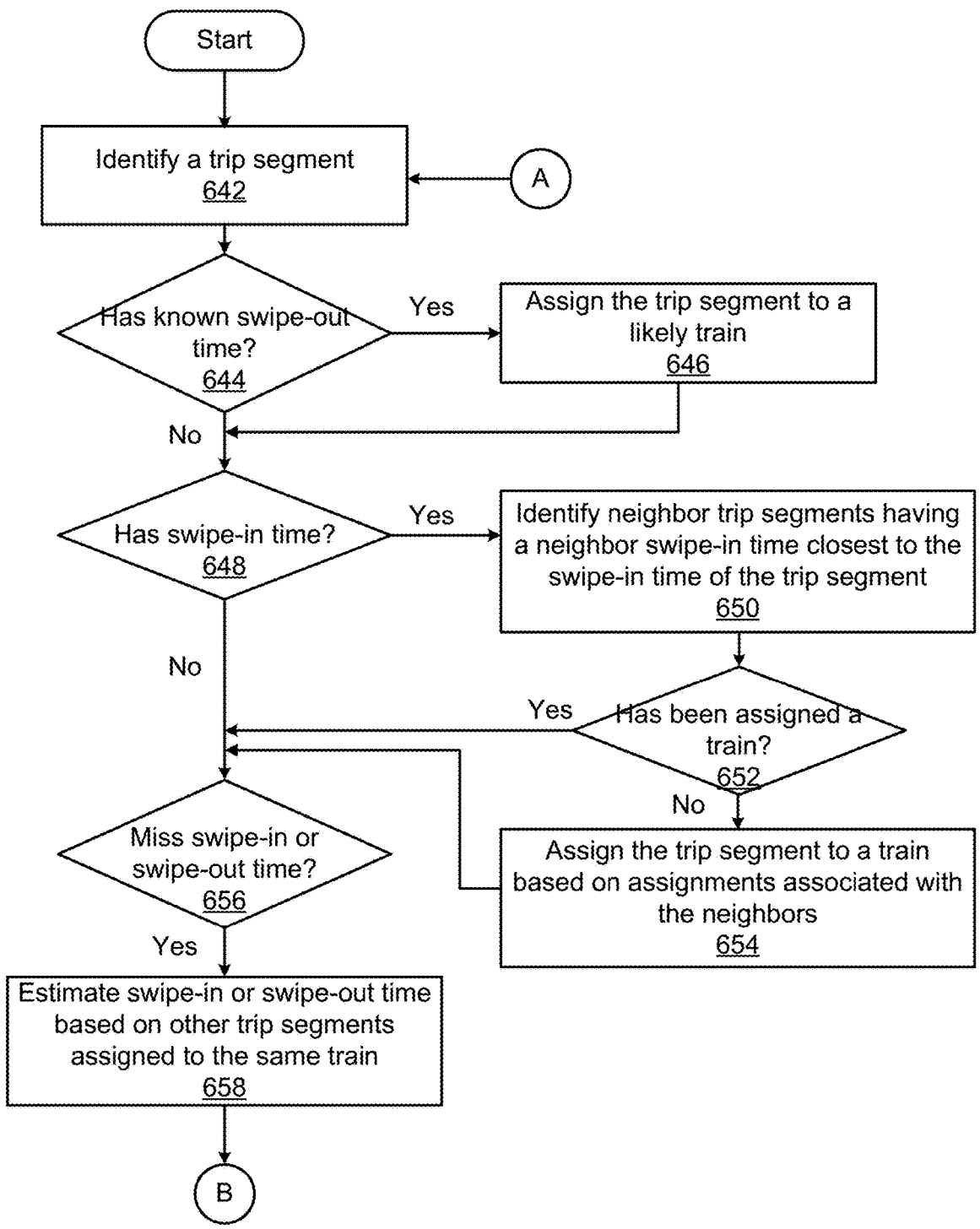
Figure 6C:
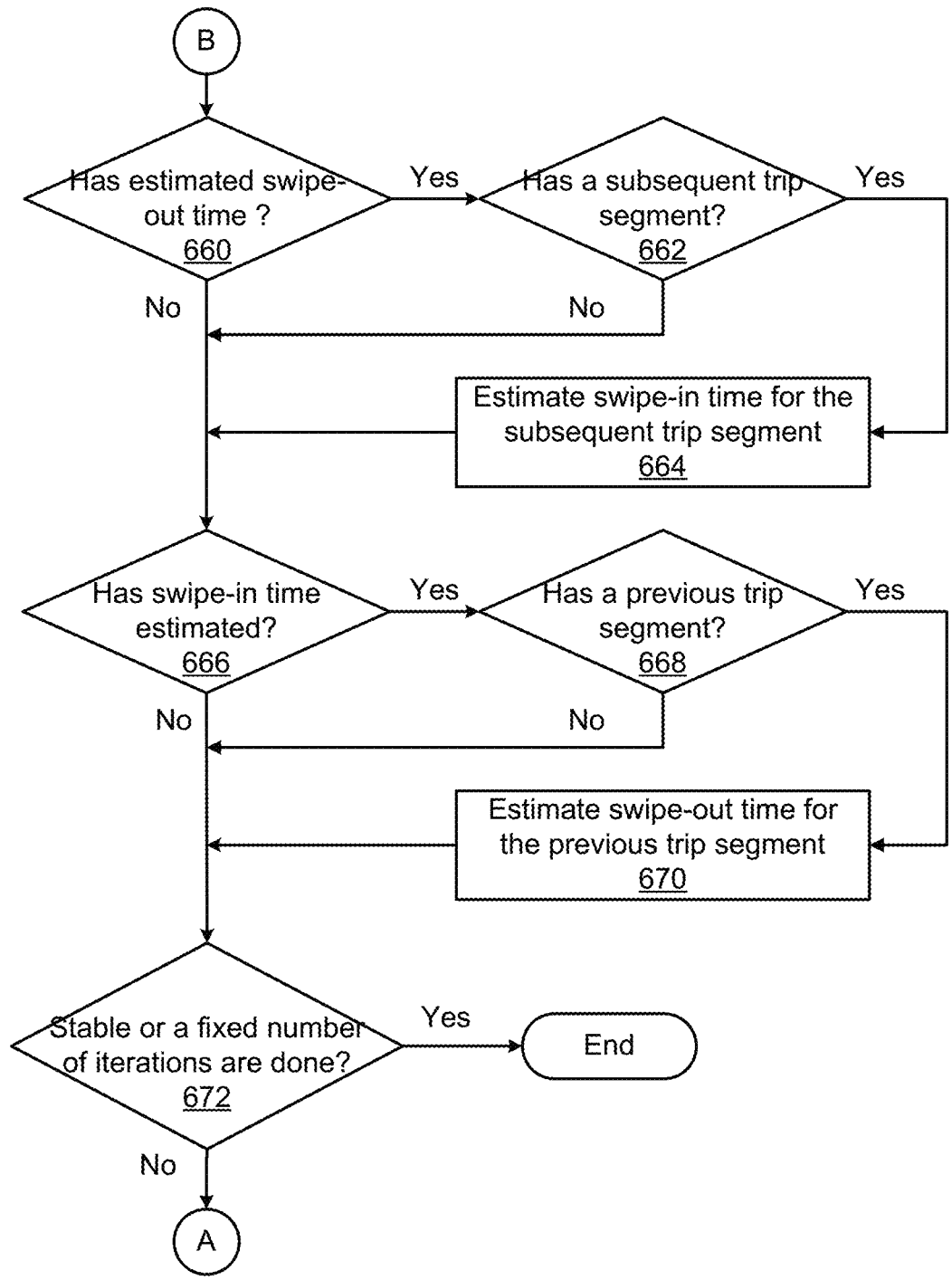

Referring now to FIGS. 6A-6C, flowcharts illustrate an example method 600 for assigning trips to vehicles in transportation systems according to one embodiment. FIGS. 6A-6C attribute the steps of the method 600 to parts of the sub-modules in the reconstruction module 115 of the server 110 or the client device 170. However, some or all of the steps may be performed by other entities. In addition, some embodiments may perform the steps in parallel, perform the steps in different orders, or perform different steps. Also, it is noted that in one example embodiment the steps and/or modules may be embodied as instructions, e.g., 224, that may be executed by the processor 202 described with respect to FIG. 2.

Referring to FIG. 6A, the collection module 310 collects 610 a trip record describing a trip of a user. The trip segmentation and assignment module 340 determines 620 the most likely route based on the trip record using a user preference model. At step 630, the trip segmentation and assignment module 340 splits 630 the trip record into one or more trip segments based on the route. For example, the trip segmentation and assignment module 340 determines segments of the trip record so that each segment can be made by boarding a single train, i.e., there is no interchange in each segment. At step 640, the trip segmentation and assignment module 340 assigns 640 trip segments to trains.

Referring to FIG. 6B, the step 640 is illustrated in further detail. The step 640 initiates the trip segmentation and assignment module 340 by identifying 642 a trip segment. At step 644, the trip segmentation and assignment module 340 determines if the trip segment has a known segment end time. If so, the trip segmentation and assignment module 340 assigns 646 the trip segment to a likely train. At step 648, the trip segmentation and assignment module 340 determines if the trip segment has a start time. If so, the trip segmentation and assignment module 340 identifies 650 neighbor trip segments having a neighbor start time closest to the start time of the trip segment. The trip segmentation and assignment module 340 determines 652 if the trip segment has been assigned to a train. If the trip segment has not been assigned to a train, the trip segmentation and assignment module 340 assigns 654 the trip segment to a train based on assignments associated with the neighbor trip segments.

At step 656, the trip segmentation and assignment module 340 determines if the trip segment misses a start or end time. If so, the trip segmentation and assignment module 340 estimates start or end time for the trip segment based on other trip segments assigned to the same train.

Referring to FIG. 6C, at step 660, the trip segmentation and assignment module 340 determines if the trip segment has an estimated end time. If so, the trip segmentation and assignment module 340 determines 662 if the trip segment has a subsequent trip segment. If so, the trip segmentation and assignment module 340 estimates 664 a segment start time for the subsequent trip segment based on the end time of its proceeding segment.

At step 666, the trip segmentation and assignment module 340 determines if the trip segment has an estimated start time. If so, the trip segmentation and assignment module 340 determines 668 if the trip segment has a previous trip segment. If so, the trip segmentation and assignment module 340 estimates 670 a start time for the previous trip segment based on the end time of its subsequent segment. At step 672, the trip segmentation and assignment module 340 determines if it is stable or a fixed number of iterations have been done. If so, the method 640 ends. Otherwise, the method 640 goes back to the step 642 to repeat the steps 642-672.

Figure 7:
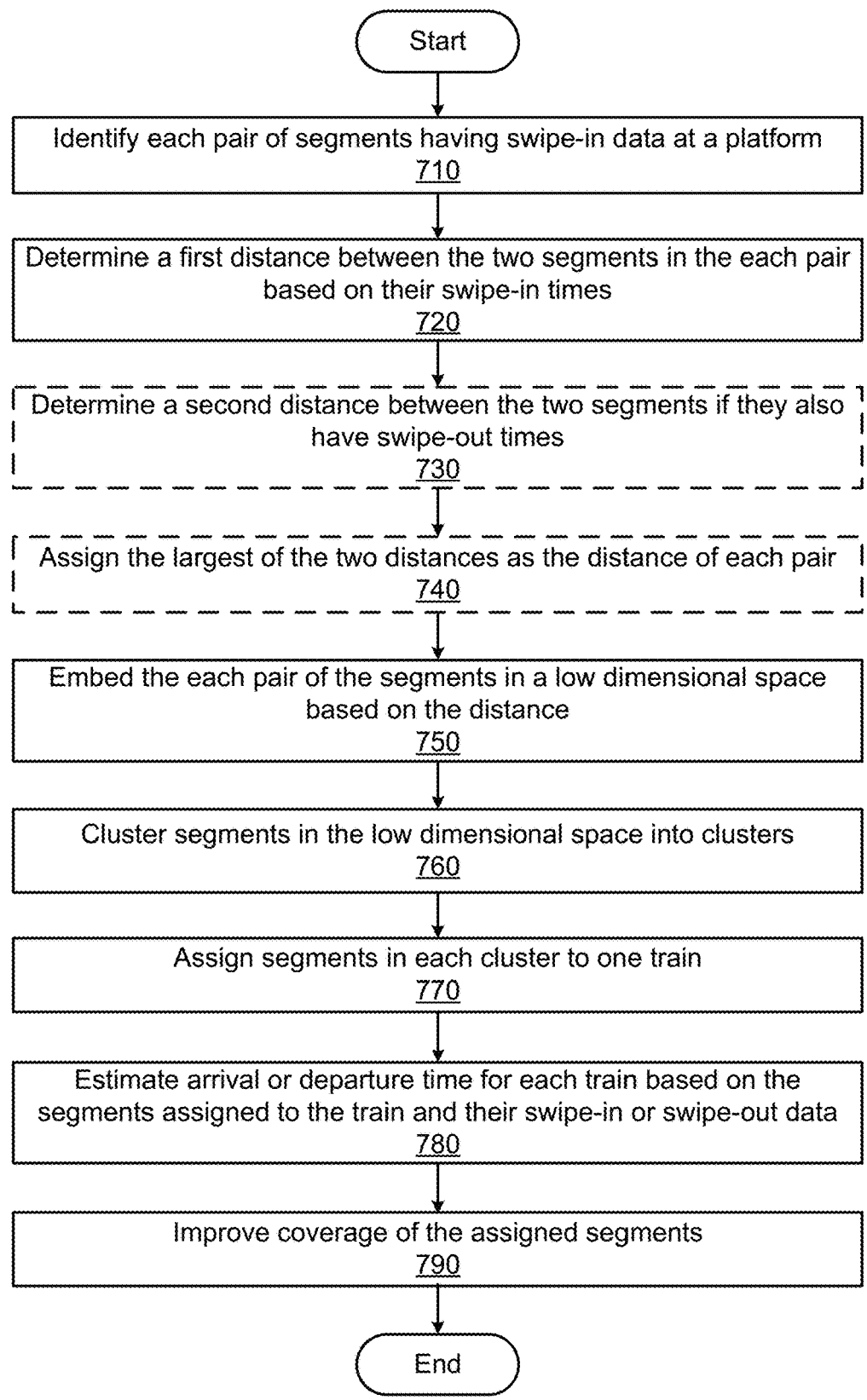
FIG. 7 is a flowchart illustrating another example method for reconstructing vehicle itineraries and trip assignments using low dimensional embedding techniques according to one embodiment.

FIG. 7 is a flowchart illustrating another example method 700 for reconstructing vehicle itineraries and trip assignments using low dimensional embedding techniques according to one embodiment. FIG. 7 attributes the method 700 to parts of the sub-modules in the reconstruction module 115 of the server 110 or the client device 170. However, some or all of the steps may be performed by other entities. In addition, some embodiments may perform the steps in parallel, perform the steps in different orders, or perform different steps. Also, it is noted that in one example embodiment the steps and/or modules may be embodied as instructions, e.g., 224, that may be executed by the processor 202 described with respect to FIG. 2.

Initially, the low dimensional embedding module 350 identifies 710 each pair of segments having boarding data such as boarding times at a platform. The low dimensional embedding module 350 determines 720 a first distance between the two segments in the each pair based on their boarding times. Optionally, the low dimensional embedding module 350 determines 730 a second distance between the two segments if they also have segment end times and assigns 740 the larger one of the two distances as the distance of each pair.

At step 750, the low dimensional embedding module 350 embeds all segments corresponding to the same service, e.g., a train line and heading, in a low dimensional space based on the distance. For example, the low dimensional embedding module 350 embeds the segments in a one, two, or three dimensional space based on the distance between the each pair.

At step 760, the low dimensional embedding module 350 controls the clustering module 310 to cluster segments in the low dimensional space into clusters. At step 770, the low dimensional embedding module 350 controls the vehicle assignment module 320 to assign segments in each cluster to one train. At step 780, the vehicle assignment module 320 estimates an arrival or departure time for each train based on the segments assigned to the train and their start or end times. At step 790, the refining module 330 improves coverage of the assigned segments.

FIG. 8 is a flowchart illustrating yet another example method 800 for reconstructing vehicle itineraries according to one embodiment. FIG. 8 attributes the method 800 to parts of the sub-modules in the reconstruction module 115 of the server 110 or the client device 170. However, some or all of the steps may be performed by other entities. In addition, some embodiments may perform the steps in parallel, perform the steps in different orders, or perform different steps. Also, it is noted that in one example embodiment the steps and/or modules may be embodied as instructions, e.g., 224, that may be executed by the processor 202 described with respect to FIG. 2.

Initially, the vehicle assignment module 320 infers 810 a sequence of stations for each bus service. For example, the vehicle assignment module 320 analyzes logical constraints and makes inferences about routes and bus identity based on the logical constraints. In one embodiment, the logical constraints are inferred from user models describing how transit passengers use the transportation network. At step 820, the vehicle assignment module 320 estimates a distribution of speeds for each bus service. For example, the vehicle assignment module 320 estimates the distribution of speeds by summarizing a list of all trip records and incorporating knowledge of the distances between stops from some outside source, e.g. an external dataset.

At step 830, the vehicle assignment module 320 accumulates a list of itineraries for each bus service. For example, initially, the list is empty. The vehicle assignment module 320 may accumulate the list by filling it up with bus vehicle itineraries of the form "A bus, which was at stop 1 from t1 to t2, and at stop 3 from t3 to t4, and at stop 4 from t5 to t6." These vehicle itineraries may list different numbers of stops. In one embodiment, the list may not include timings for every stop.

At step 840, optionally the vehicle assignment module 320 sorts the trips in records by boarding time. At step 850, the vehicle assignment module 320 estimates a likelihood that a trip in the records belongs to each of itineraries in the list. This likelihood may be model-based. For example, the likelihood is estimated based on a user model. In addition, the likelihood may incorporate models for how long a vehicle is likely to stay at a stop, how long it takes a passenger to swipe in after boarding, and the speed distribution from step 820. It also incorporates logical constraints regarding the reasonable passengers' usage of the network.

At step 860, the vehicle assignment module 320 determines if it is very likely that the trip belongs to a vehicle itinerary in the list. For example, if the probability that a trip belongs to a particular itinerary is greater than a threshold such as 20%, 50%, etc. In one embodiment, the vehicle assignment module 320 also determines if the second most likely bus is substantially less likely. For example, probability that the trip belongs to the second vehicle itinerary in the list is less than a threshold such as 1%, 0.1%, etc. If it is very likely that the trip belongs to a bus in the list, the vehicle assignment module 320 assigns 870 the trip to the most likely bus. If it is very unlikely that the trip belongs to any of the listed bus vehicles, the vehicle assignment module 320 appends 880 a new bus vehicle itinerary to the list, with its stop times determined by this new trip.

At step 890, the vehicle assignment module 320 determines if all trips have been assigned. If not all trips have been assigned, the method 800 moves back to step 850 to repeat the assignment process until all trips have been assigned. In one embodiment, the iterative assignment steps 850-880 can be performed by the refining module 330.

Example Flow of Clusters

Figure 9:
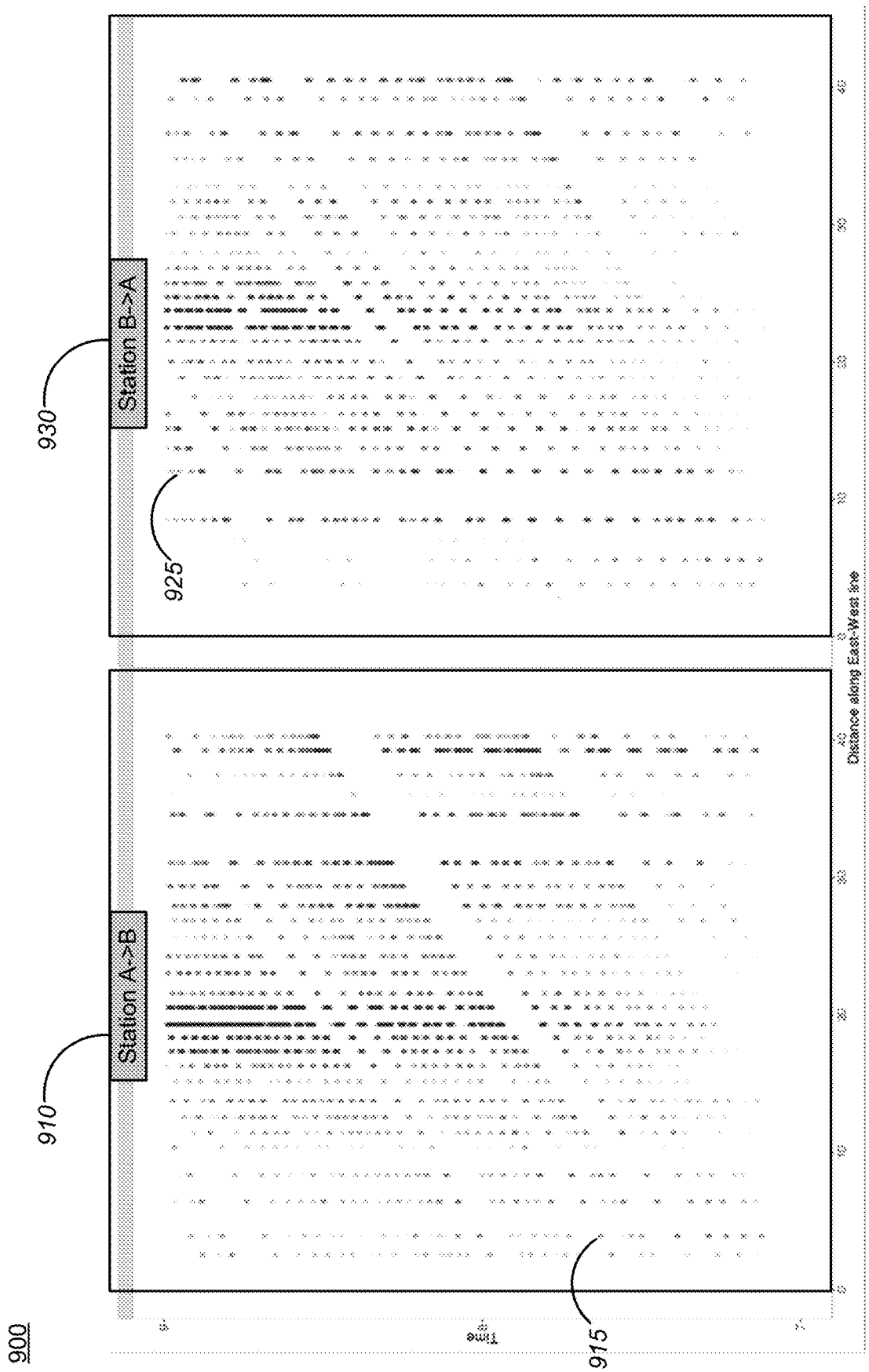
FIG. 9 is a chart illustrating sequences of clusters over time and stations according to one embodiment.

Referring now to FIG. 9, a chart illustrating sequences of clusters over time and stations are shown according to one embodiment. FIG. 9 includes two parts 910, 930 of the chart 900 under a coordinate system with a horizontal axis showing the distance along an East to West service line, and a vertical axis showing the time. Each of the parts 910, 930 includes many black dots, such as the ones labeled as 915, 925, representing clusters at certain times and certain locations along the East to West service line. For example, these black dots 915, 925 may represent swipe-in or swipe-out events occurred at the certain times and certain locations. Each dot is illustrated in the coordinate system using the time and location associated with the event represented by the dot. In addition, many of the clusters form sequences of clusters over time and location. The part 910 of the chart 900 shows sequences of clusters over time 7 AM-9 AM and in the direction of station A to station B. The part 930 of the chart 900 shows sequences of clusters over time 7 AM-9 AM and in the direction of station B to station A.

Example User Interfaces

Figure 10:
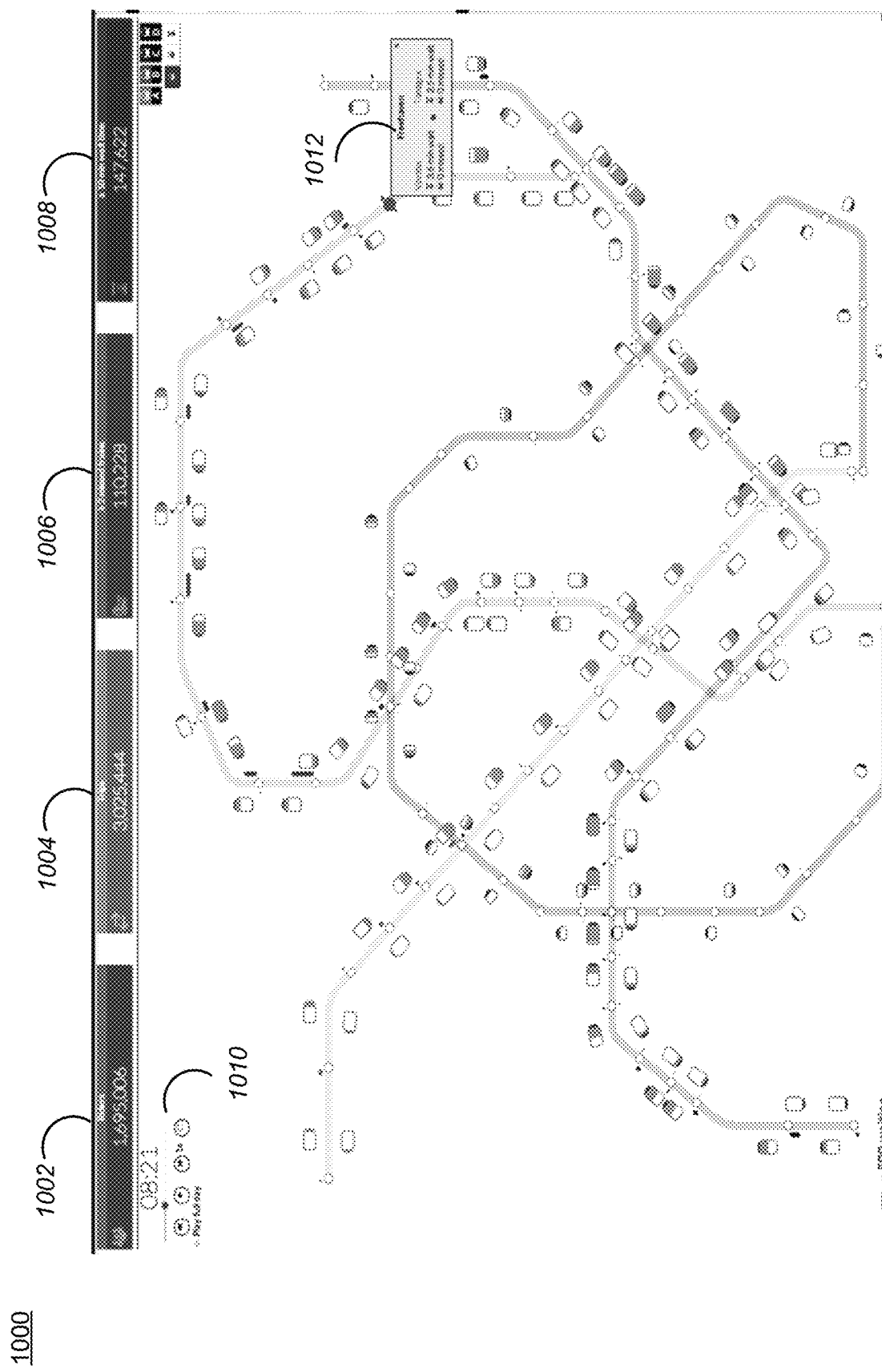
FIGS. 10-17 are example graphical representations for user interfaces displaying different aspects of reconstructed transportation systems.

Referring now to FIGS. 10-17, illustrated are example graphical representations for user interfaces displaying different aspects of reconstructed transportation systems. For example, the GUIs are generated by the visualization module 177 of the client device 170. FIG. 10 illustrates a GUI 1000 showing an overall traffic condition for a train system. For example, the train system includes four train lines A, B, C, D. The GUI 1000 of FIG. 10 displays the routes for the four train lines A, B, C, D. The GUI 1000 also shows, at each time, locations of the trains for each line, occupancy condition for each train, the number of waiting riders at each station and an estimated waiting time at each station. For example, the GUI 1000 includes a box 1002 showing the number of riders, a box 1004 showing the number of trips, a box 1006 showing the number of riders who missed more than two trains, and a box 1008 showing the number of riders who have been waiting for more than 10 minutes. In one embodiment, the reconstruction module 115 reconstructs the itineraries and occupancy condition of each trains in the system based on collected trip records and/or fleet data. The visualization module 177 of the client device 170 renders the GUI 1000 using the reconstructed itineraries and occupancy condition of the trains.

The GUI 1000 also includes a play control box 1010 that allows a user to select to play the evolvement of the train system, which illustrates the changes of the locations of the trains, occupancy condition of the trains, numbers of riders, waiting times, etc., during a day. The GUI 1000 also includes an information box 1012 associated with a train station. The information box 1012 shows the waiting time and the number of riders who missed any trains at one or more nearby stations.

Figure 11:
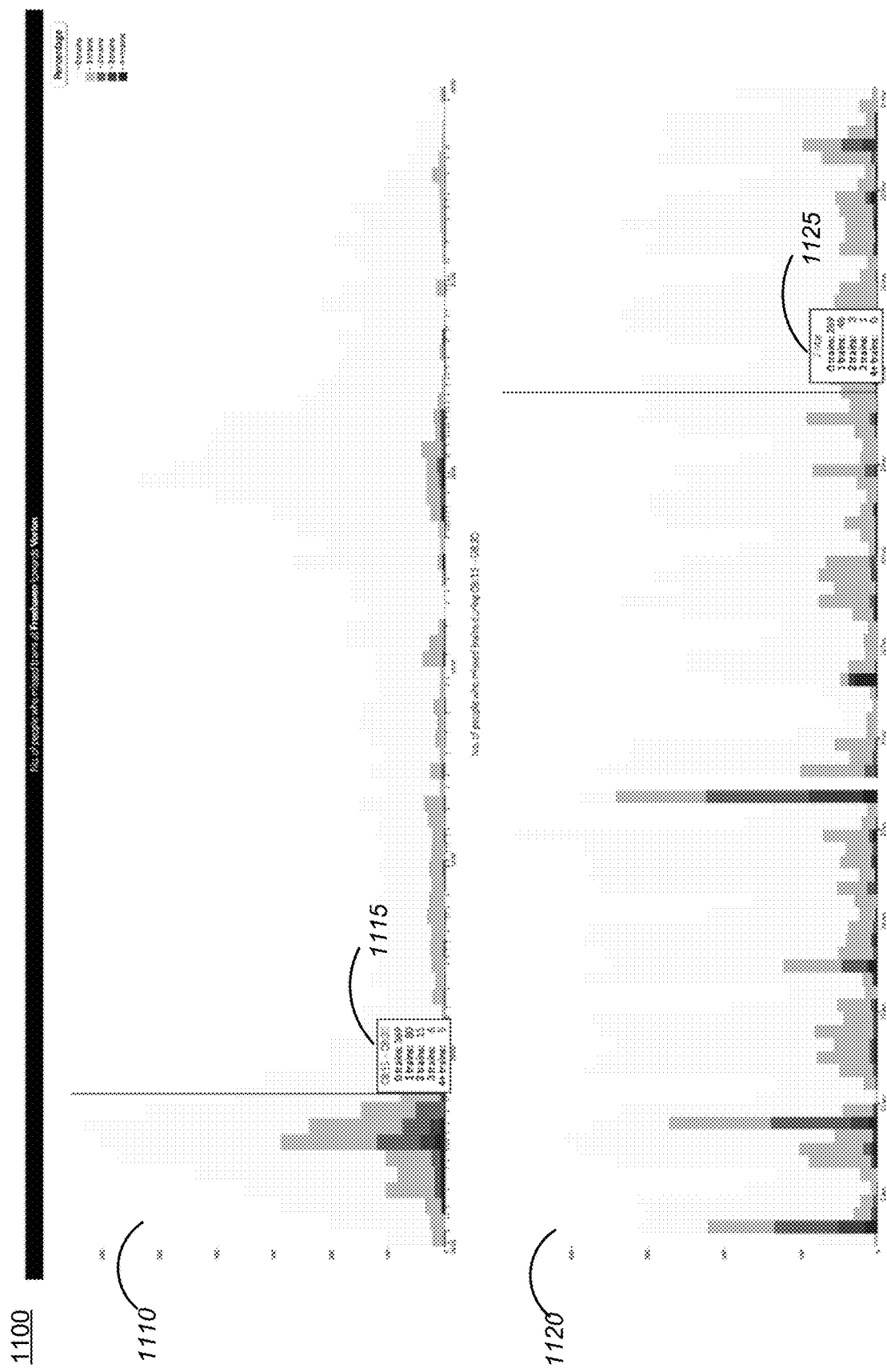

FIG. 11 illustrates charts 1110, 1120 that display the numbers of people who missed trains. For example, the chart 1110 shows the numbers of people who missed zero trains, one train, two trains, three trains and four or more trains from 6:00 AM to 11:59 PM during a day. To display an exemplary statistic, the chart 1110 also includes a list 1115 describing the numbers of people who missed zero trains, one train, two trains, three trains and four or more trains during 8:15 AM-8:30 AM. For example, the numbers of people who missed trains over a day can be calculated by the reconstruction module 115 based on the comparison of the trip records and the corresponding fleet data.

The chart 1120 shows the numbers of people who missed zero train, one train, two trains, three trains and four or more trains during 8:15 AM-8:30 AM from January 1 to March 31. The chart 1120 also includes a list 1125 describing the numbers of people who missed zero train, one train, two trains, three trains and four or more trains during 8:15 AM-8:30 AM on March 7. Similarly, the numbers of people who missed trains from January 1 to March 31 can be calculated by the reconstruction module 115 based on the comparison of the trip records and the corresponding fleet data.

Figure 12:

FIG. 12 illustrates a visualization 1200 showing routes of bus lines and locations of buses. The visualization 1200 also displays occupancy of each bus. In one embodiment, data describing routes of bus lines, locations of buses and occupancy of each bus can be reconstructed by the reconstruction module 115. The client device 170 requests and receives the reconstructed data for rendering the visualization 1200.

Figure 13:
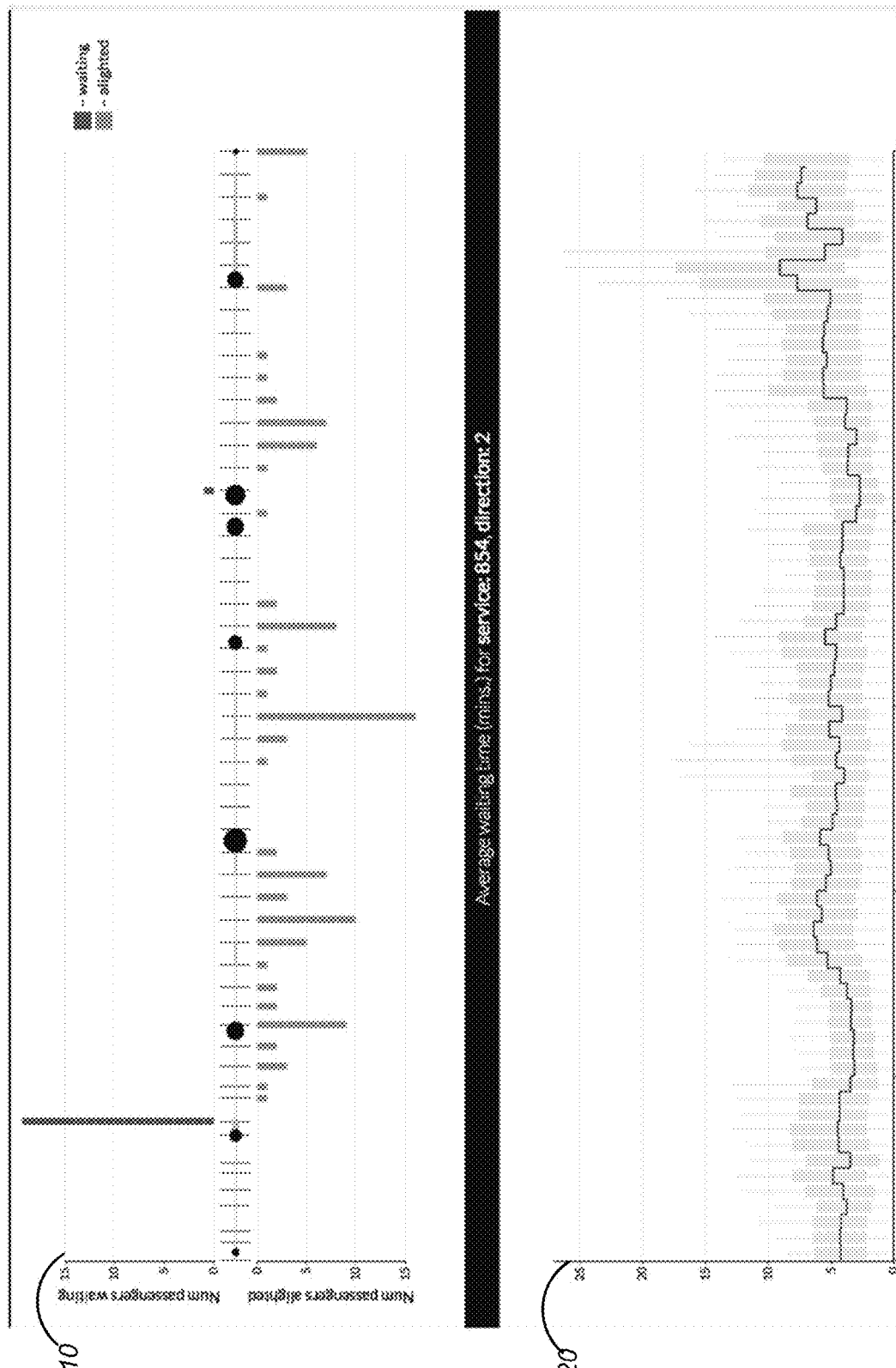

FIG. 13 illustrates charts 1310, 1320 related to a certain bus line. For example, the chart 1310 displays the numbers of passengers waiting and alighted at each station. The chart 1320 displays average waiting times for this certain bus line during 6:00 AM-00:00 AM. In one embodiment, the numbers of passengers waiting and alighted at each station are calculated by the reconstruction module 115. The client device 170 uses the reconstructed information to render the chart 1310. The average waiting times for this certain bus line during 6:00 AM-00:00 AM can be rendered in the chart 1320 in a similar manner.

Figure 14:
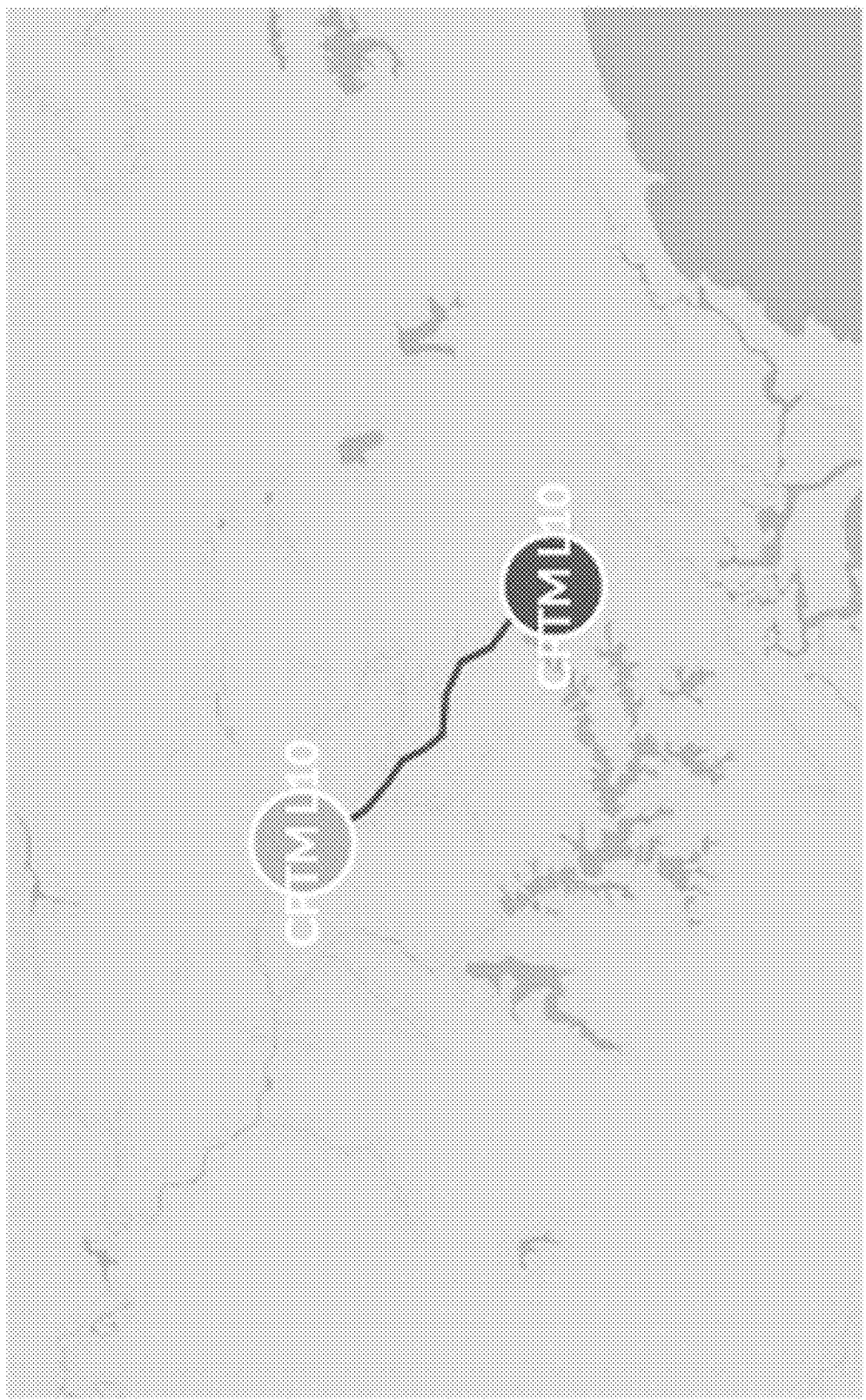

FIG. 14 illustrates a user interface 1400 shows a general picture of a transportation system.

Figure 15:
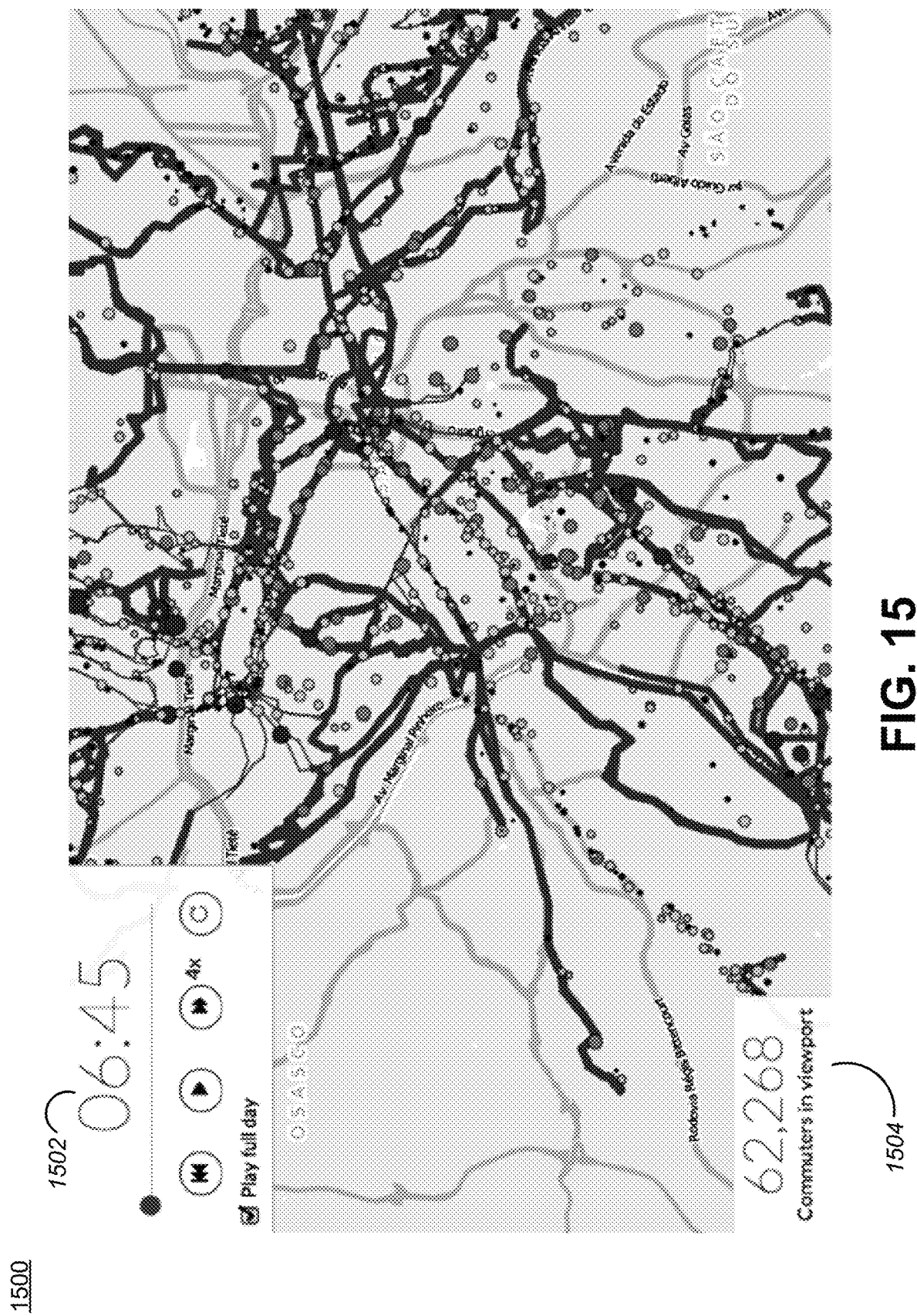

FIG. 15 illustrates a visualization 1500 showing a view of a bus line system that includes multiple bus lines. Similar to the process described with reference to FIG. 12, data describing routes of bus lines, locations of buses and occupancy of each bus can be reconstructed by the reconstruction module 115. For example, FIG. 15 includes a play control box 1502 that allows a user to select to play the evolvement of the bus system, which illustrates the changes of the locations of the buses, occupancy condition of the buses, and numbers of riders, etc., during a day. FIG. 15 also includes an information box 1504 showing the number of commuters in viewport. The client device 170 requests and receives the reconstructed data for rendering the visualization 1500.

Figure 16:
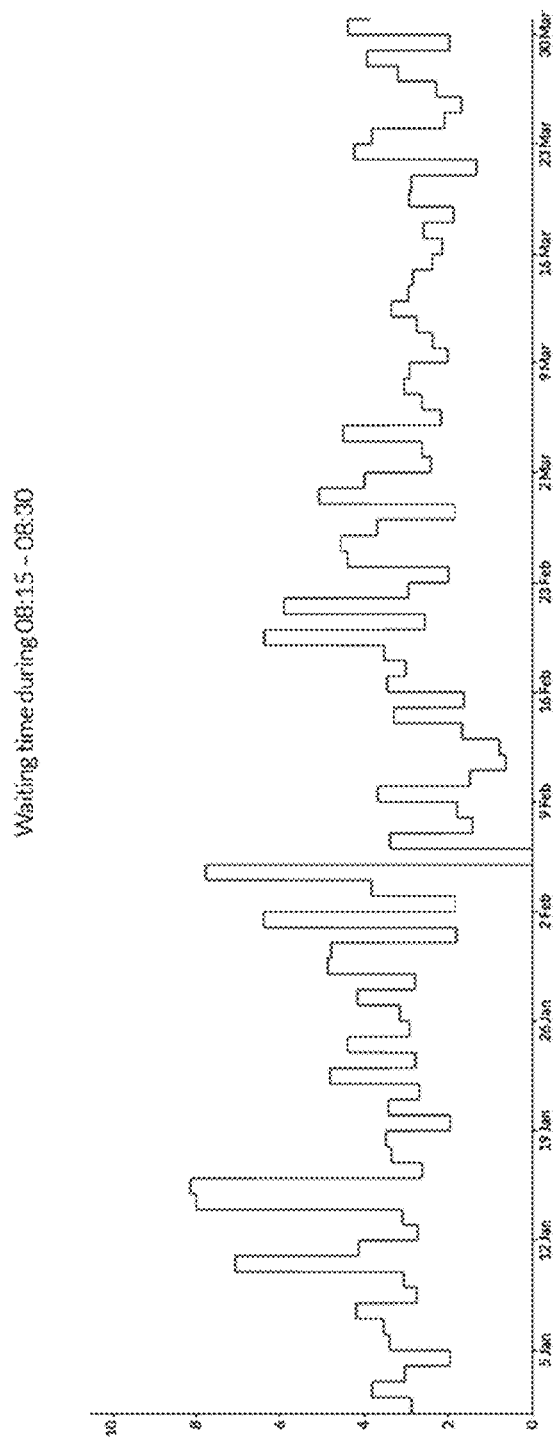

FIG. 16 illustrates a chart 1600 showing waiting times during 8:15 AM-8:30 AM for January. For example, the waiting times during 8:15 AM-8:30 AM can be reconstructed by the reconstruction module 115. The client device 170 requests and receives the reconstructed data for rendering the chart 1600.

Figure 17:
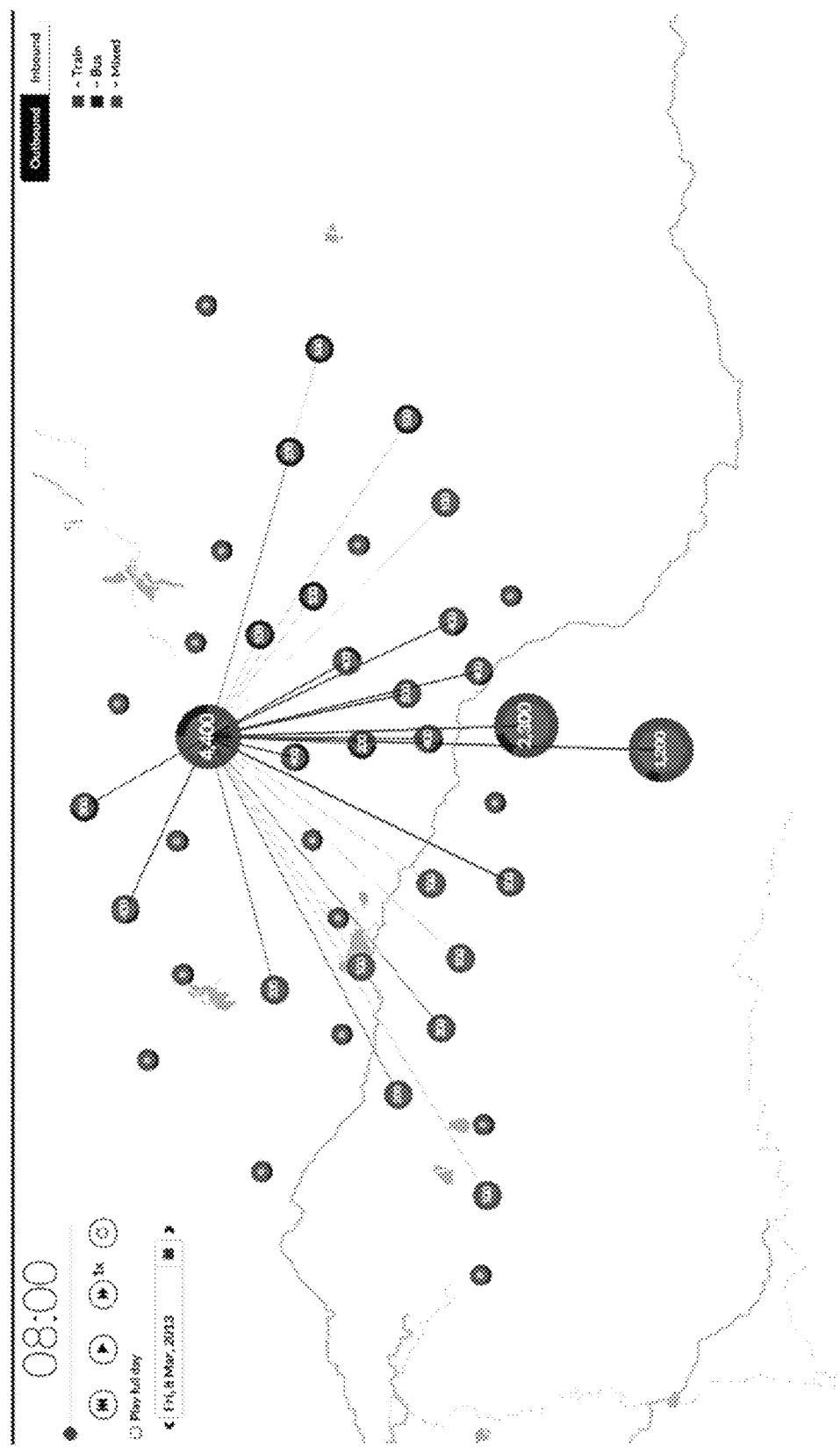

FIG. 17 illustrates a visualization 1700 showing outbound commuter flows on a map. In one embodiment, possible work locations and resident locations of passengers using the transportation system can be estimated based on the commuter flows. Statistics summarizing the experience of commuters can be obtained from the results of the reconstruction module 115 based on collected trip records and/or fleet data. The client device 170 requests and receives the reconstructed data for rendering the chart 1700.

Additional Configuration Considerations

Accordingly, as described above, the system and method for transportation system reconstruction provides numerous advantages over the traditional model. For example, the system can use reconstruction to deliver a software solution (e.g., a packaged, on premise, or cloud-based software solution) to transportation operators and system and/or urban planners. In addition, the system can visualize the reconstructed data, including the number of people on the bus or train, at a station or stop, picked up at each station on a particular date and time, by depicting the data by size or filling of train or bus icon.

Based on the reconstructed information, the system can further detect anomalies of the transportation systems. The system can detect if the number of people on the platform exceeds the maximum allowable amount or a threshold set by the transportation system operators. Furthermore, the system can display alerts when anomalies are detected, with the ability to comment on and share those alerts via a web-based interface, by email, or otherwise. In addition, the system can create reports including, but not limited to, reports by station, date and time, commuter segments and location, and share these reports via email, a web-based interface, or otherwise.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors, e.g., processor 202) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software (or program code) to perform certain operations. It will be appreciated that the decision to implement a hardware module mechanically, in dedicated and permanently configured circuitry, or in temporarily configured circuitry (e.g., configured by software or program code) may be driven by cost and time considerations.

The various operations of example methods described herein may be performed, at least partially, by one or more processors, e.g., processor 202, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors 202), these operations being accessible via a network (e.g., the Internet) and via one or more appropriate interfaces (e.g., application program interfaces (APIs).)

The performance of certain of the operations may be distributed among the one or more processors, e.g., processor 202, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for transportation system reconstruction. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for reconstructing a trip assignment, the method comprising:
   collecting, by one or more processors, a trip record describing a trip of a user, the trip record including swipe-in and swipe-out times at stations;
   analyzing, by the one or more processors, trip records obtained from an external data source to generate a user preference model that indicates a likely length of time it takes a bus passenger to swipe in after boarding a bus;
   determining, by the one or more processors, a most likely route based on the trip record using the user preference model;
   splitting the trip record into one or more trip segments based on the most likely route;
   assigning the one or more trip segments to one or more vehicles; and
   providing, by the one or more processors to a client device, data related to the assigned trip segments.

2. The method of claim 1, wherein each of the one or more trip segments represents a segment of the trip made by boarding a single vehicle.

3. The method of claim 1, wherein assigning the one or more trip segments to one or more vehicles comprises:
   determining whether one of the trip segments includes a segment end time; and
   responsive to determining that the one trip segment includes the segment end time, assigning the one trip segment to a likely vehicle based on the segment end time and an arrival time of the likely vehicle.

4. The method of claim 1, wherein assigning the one or more trip segments to one or more vehicles comprises:
   determining whether one of the trip segments includes a segment start time;
   responsive to determining that the one trip segment includes the segment start time, identifying a set of neighbor trip segments having neighbor segment start times closest to the segment start time; and
   assigning the one trip segment to a vehicle based on assignments associated with the set of neighbor trip segments.

5. The method of claim 1, wherein assigning the one or more trip segments to one or more vehicles comprises:
   determining whether one of the trip segments that has been assigned to a vehicle is missing a segment start or segment end time; and
   responsive to determining that the one trip segment that has been assigned to a vehicle is missing a segment start or segment end time, estimating the segment start or segment end time for the one trip segment based on other trip segments assigned to the same vehicle.

6. The method of claim 5, further comprising:
   responsive to the segment end time being estimated for the one trip segment, determining a subsequent trip segment for the one trip segment, the subsequent trip segment missing a segment start time; and
   estimating the segment start time for the subsequent trip segment based on the estimated segment end time for the one trip segment.

7. The method of claim 5, further comprising:
   responsive to the segment start time being estimated for the one trip segment, determining a previous trip segment for the one trip segment, the previous trip segment missing a segment end time; and
   estimating the segment end time for the previous trip segment based on the estimated segment start time for the one trip segment.

8. A computer-implemented method for reconstructing a trip assignment, the method comprising:
   collecting, by one or more processors, a trip record describing a trip of a user, the trip record including swipe-in and swipe-out times at stations;
   analyzing, by the one or more processors, trip records obtained from an external data source to generate a user preference model that indicates a likely length of time it takes a passenger to walk from a swipe-in entrance of a station to a train platform;
   determining, by the one or more processors, a most likely route based on the trip record using the user preference model;
   splitting the trip record into one or more trip segments based on the most likely route;
   assigning the one or more trip segments to one or more vehicles; and
   providing, by the one or more processors to a client device, data related to the assigned trip segments.

9. The method of claim 8, wherein each of the one or more trip segments represents a segment of the trip made by boarding a single vehicle.

10. The method of claim 8, wherein assigning the one or more trip segments to one or more vehicles comprises:
    determining whether one of the trip segments includes a segment end time; and
    responsive to determining that the one trip segment includes the segment end time, assigning the one trip segment to a likely vehicle based on the segment end time and an arrival time of the likely vehicle.

11. The method of claim 8, wherein assigning the one or more trip segments to one or more vehicles comprises:
    determining whether one of the trip segments includes a segment start time;
    responsive to determining that the one trip segment includes the segment start time, identifying a set of neighbor trip segments having neighbor segment start times closest to the segment start time; and
    assigning the one trip segment to a vehicle based on assignments associated with the set of neighbor trip segments.

12. The method of claim 8, wherein assigning the one or more trip segments to one or more vehicles comprises:
    determining whether one of the trip segments that has been assigned to a vehicle is missing a segment start or segment end time; and responsive to determining that the one trip segment that has been assigned to a vehicle is missing a segment start or segment end time, estimating the segment start or segment end time for the one trip segment based on other trip segments assigned to the same vehicle.

13. The method of claim 12, further comprising:
responsive to the segment end time being estimated for the one trip segment, determining a subsequent trip segment for the one trip segment, the subsequent trip segment missing a segment start time; and
estimating the segment start time for the subsequent trip segment based on the estimated segment end time for the one trip segment.

14. The method of claim 13, further comprising:
responsive to the segment start time being estimated for the one trip segment, determining a previous trip segment for the one trip segment, the previous trip segment missing a segment end time; and
estimating the segment end time for the previous trip segment based on the estimated segment start time for the one trip segment.

15. A non-transitory computer-readable medium storing instructions that, when executed by one or more processors, cause the one or more processors to:
collect a trip record describing a trip of a user, the trip record including swipe-in and swipe-out times at stations;
analyze trip records obtained from an external data source to generate a user preference model that indicates a likely length of time it takes a bus passenger to swipe in after boarding a bus;
determine most likely route based on the trip record using the user preference model;
split the trip record into one or more trip segments based on the most likely route;
assign the one or more trip segments to one or more vehicles; and
provide, to a client device, data related to the assigned trip segments.

16. The non-transitory computer-readable medium of claim 15, wherein each of the one or more trip segments represents a segment of the trip made by boarding a single vehicle.

17. The non-transitory computer-readable medium of claim 15, wherein assigning the one or more trip segments to one or more vehicles comprises:
determining whether one of the trip segments includes a segment end time; and
responsive to determining that the one trip segment includes the segment end time, assigning the one trip segment to a likely vehicle based on the segment end time and an arrival time of the likely vehicle.

18. The non-transitory computer-readable medium of claim 15, wherein assigning the one or more trip segments to one or more vehicles comprises:
determining whether one of the trip segments includes a segment start time;
responsive to determining that the one trip segment includes the segment start time, identifying a set of neighbor trip segments having neighbor segment start times closest to the segment start time; and
assigning the one trip segment to a vehicle based on assignments associated with the set of neighbor trip segments.

19. The non-transitory computer-readable medium of claim 15, wherein assigning the one or more trip segments to one or more vehicles comprises:
determining whether one of the trip segments that has been assigned to a vehicle is missing a segment start or segment end time; and
responsive to determining that the one trip segment that has been assigned to a vehicle is missing a segment start or segment end time, estimating the segment start or segment end time for the one trip segment based on other trip segments assigned to the same vehicle.

20. The non-transitory computer-readable medium of claim 19, the instructions further configured to:
responsive to the segment end time being estimated for the one trip segment, determine a subsequent trip segment for the one trip segment, the subsequent trip segment missing a segment start time; and
estimate the segment start time for the subsequent trip segment based on the estimated segment end time for the one trip segment.

* * * * *